US010801570B2

(12) United States Patent
Staahl et al.

(10) Patent No.: US 10,801,570 B2
(45) Date of Patent: Oct. 13, 2020

(54) SENSOR DEVICE AND DISC BRAKE HAVING A SENSOR DEVICE

(71) Applicant: KNORR-BREMSE Systeme fuer Nutzfahrzeuge GmbH, Munich (DE)

(72) Inventors: Christian Staahl, Munich (DE); Michael Blessing, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 372 days.

(21) Appl. No.: 15/214,928

(22) Filed: Jul. 20, 2016

(65) Prior Publication Data

US 2016/0327109 A1    Nov. 10, 2016

Related U.S. Application Data

(63) Continuation of application No. PCT/EP2015/050735, filed on Jan. 16, 2015.

(30) Foreign Application Priority Data

Jan. 20, 2014  (DE) .................. 10 2014 100 562

(51) Int. Cl.
*F16D 65/56* (2006.01)
*F16D 65/18* (2006.01)
(Continued)

(52) U.S. Cl.
CPC ....... *F16D 65/568* (2013.01); *F16D 55/2255* (2013.01); *F16D 65/183* (2013.01);
(Continued)

(58) Field of Classification Search
CPC ...... F16D 66/02; F16D 66/028; F16D 66/026; F16D 66/027; F16D 65/56; F16D 65/567;
(Continued)

(56) References Cited

U.S. PATENT DOCUMENTS 6,129,183 A    10/2000 Ward
7,926,626 B2    4/2011 Iraschko
(Continued)

FOREIGN PATENT DOCUMENTS

CN    101375079 A    2/2009
CN    101802436 A    8/2010
(Continued)

OTHER PUBLICATIONS

Electronic Translation of EP0566006A1.*
(Continued)

*Primary Examiner* — Melody M Burch
(74) *Attorney, Agent, or Firm* — Crowell & Moring LLP

(57) ABSTRACT

A sensor device for detecting brake pad and brake disc wear of a disc brake, in particular for a motor vehicle, includes a sensor device and a transmission unit. The sensor device has at least one transducer and at least one sensor transmission having at least one transmission input and is connected to a transducer. The transmission unit is connected to the transmission input and is designed to be connected to a threaded spindle of the disc brake to be associated therewith in order to transmit a wear-related rotary movement. The transmission unit has a drive sleeve for co-rotational connection to the threaded spindle, an output sleeve which is connected to the drive sleeve, at least one spring element and a driver for co-rotational connection to the transmission input, which is connected to the output sleeve for co-rotation therewith. A disc brake includes such a sensor device.

14 Claims, 12 Drawing Sheets

(51) Int. Cl.
*F16D 55/2255* (2006.01)
*F16D 66/02* (2006.01)
*F16D 125/26* (2012.01)
*F16D 125/64* (2012.01)
*F16D 121/14* (2012.01)
*F16D 125/60* (2012.01)

(52) U.S. Cl.
CPC ........ *F16D 66/026* (2013.01); *F16D 2121/14* (2013.01); *F16D 2125/26* (2013.01); *F16D 2125/60* (2013.01); *F16D 2125/64* (2013.01)

(58) Field of Classification Search
CPC .. F16D 65/568; F16D 65/183; F16D 55/2255; F16D 2125/26; F16D 2125/60; F16D 2125/64; F16D 2121/14
See application file for complete search history.

(56) References Cited

U.S. PATENT DOCUMENTS

| | | |
|---|---|---|
| 2009/0014262 A1 | 1/2009 | Camilo-Martinez et al. |
| 2010/0230219 A1 | 9/2010 | Helf |
| 2013/0139580 A1* | 6/2013 | Helf ...................... F16D 65/568 73/121 |
| 2014/0353094 A1 | 12/2014 | Welin |
| 2015/0068852 A1* | 3/2015 | Weber ................... F16D 65/567 188/71.8 |
| 2015/0192181 A1* | 7/2015 | Asen ................... F16D 55/2255 188/71.8 |

FOREIGN PATENT DOCUMENTS

| | | |
|---|---|---|
| DE | 42 12 387 A1 | 10/1993 |
| DE | 697 21 488 T2 | 3/2004 |
| DE | 10 2004 037 771 A1 | 3/2006 |
| DE | 10 2006 042 777 B3 | 10/2007 |
| DE | 20 2012 001 863 U1 | 3/2012 |
| DE | 10 2012 102 582 A1 | 9/2013 |
| EP | 0 460 378 A2 | 12/1991 |
| EP | 0 460 378 B1 | 10/1994 |
| EP | 0 566 006 B1 | 2/1996 |
| JP | 2010-540846 A | 12/2010 |
| WO | WO-9729297 A1 * | 8/1997 ........... F16D 65/183 |
| WO | WO-9729298 A1 * | 8/1997 ........... F16D 65/183 |
| WO | WO-03067115 A1 * | 8/2003 ............. F16D 66/02 |

OTHER PUBLICATIONS

International Search Report (PCT/ISA/210) issued in PCT Application No. PCT/EP2015/050735 dated May 6, 2015 with English translation (six pages).

German-language Written Opinion (PCT/ISA/237) ) issued in PCT Application No. PCT/EP2015/050735 dated May 6, 2015 with English translation (nine pages).

German Office Action issued in counterpart German Application No. 10 2014 100 562.7 dated Feb. 27, 2015 (seven pages).

International Preliminary Report on Patentability (PCT/IB/338 & PCT/IB/373) issued in PCT Application No. PCT/EP2015/050735 dated Aug. 4, 2016, including English translation of document C2 (German-language Written Opinion (PCT/ISA/237)) previously filed on Jul. 20, 2016 (six (6) pages).

Chinese-language Office Action issued in counterpart Chinese Application No. 201580011246.1 dated Jan. 31, 2018 with English translation (nine pages).

Indian-language Office Action issued in counterpart Indian Application No. 201637024766 dated Jun. 27, 2019 with English translation (five pages).

* cited by examiner

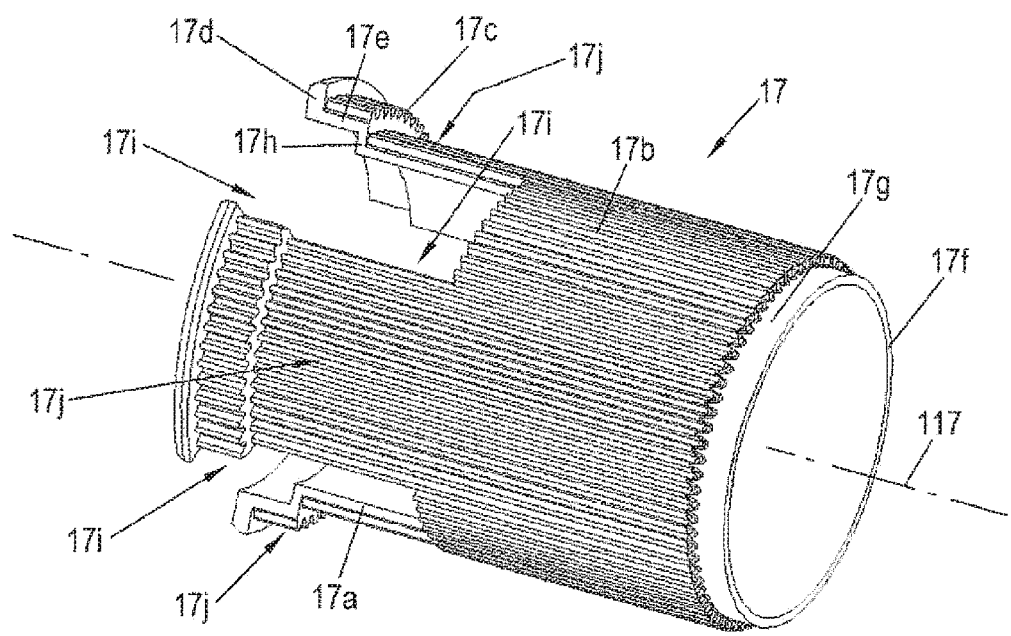
Fig. 6
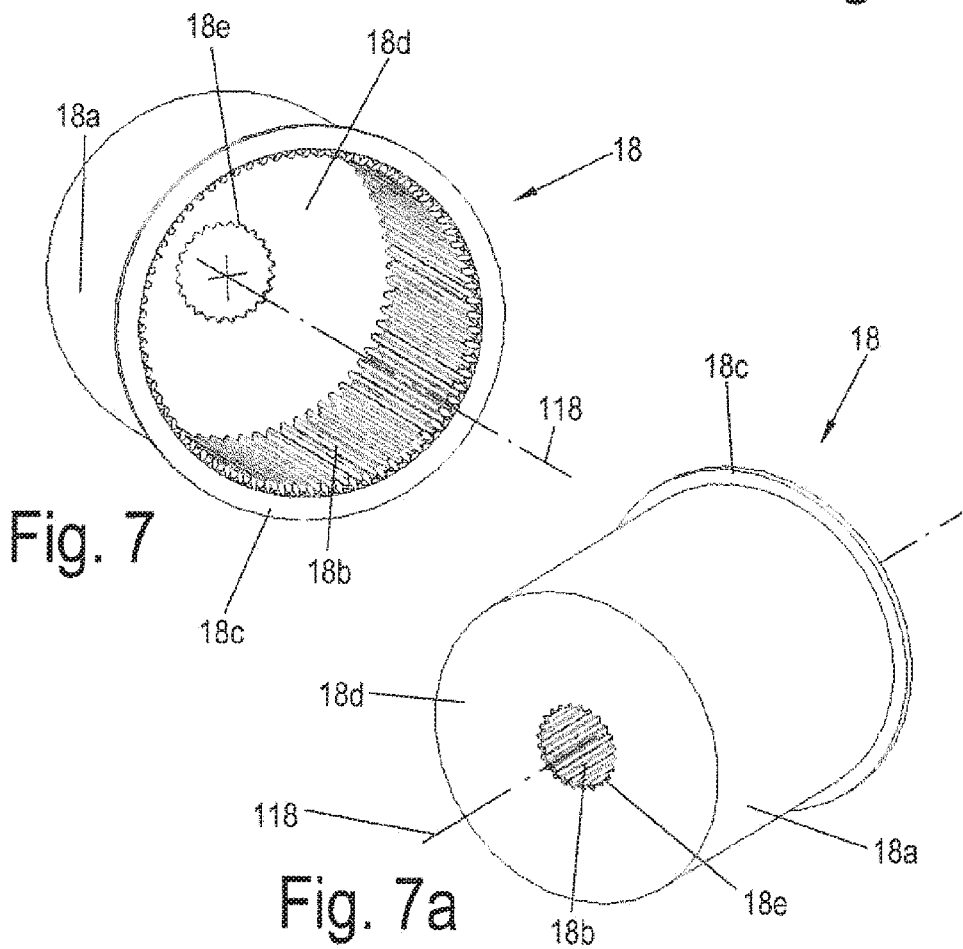
Fig. 7
Fig. 7a

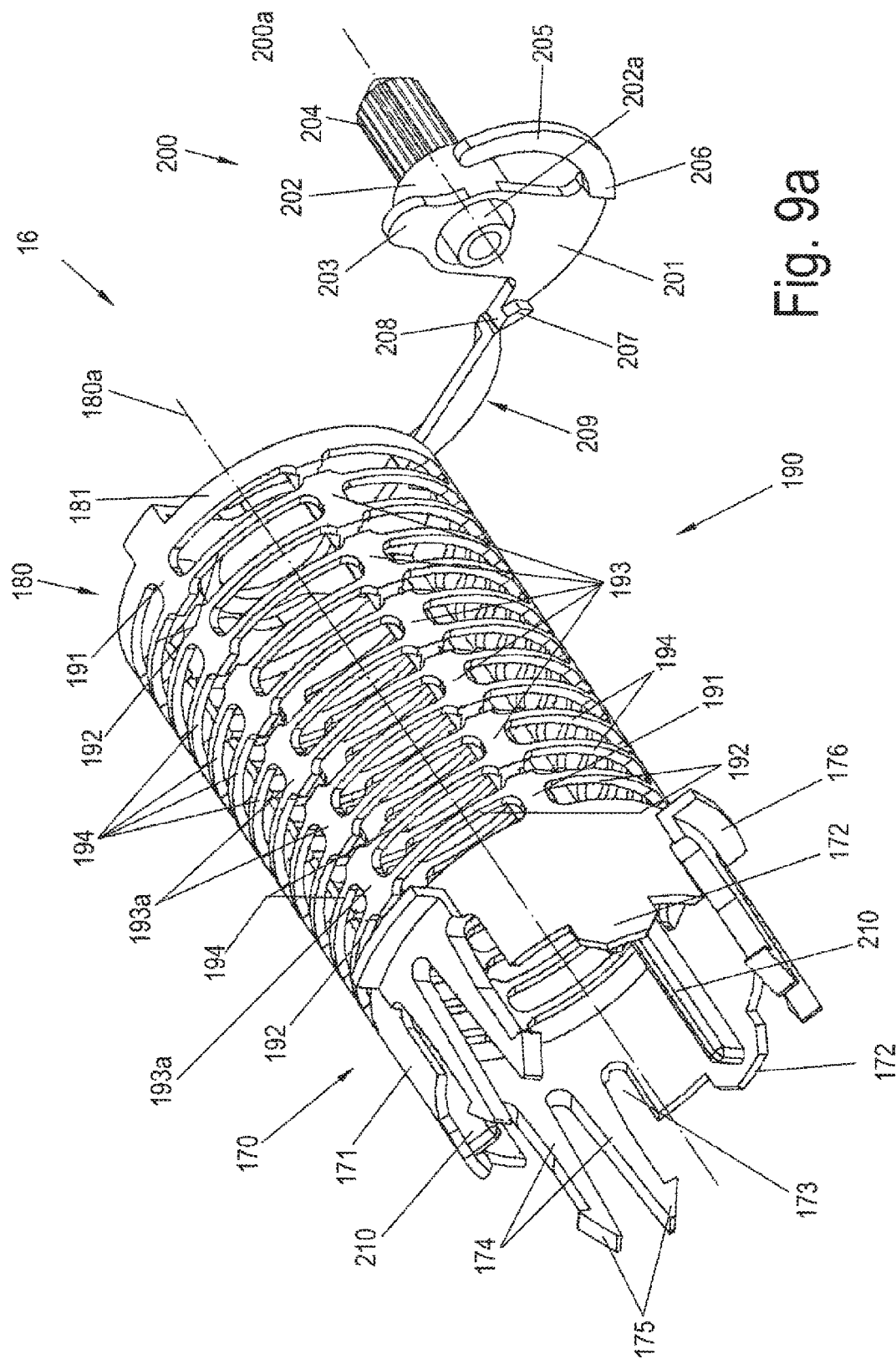

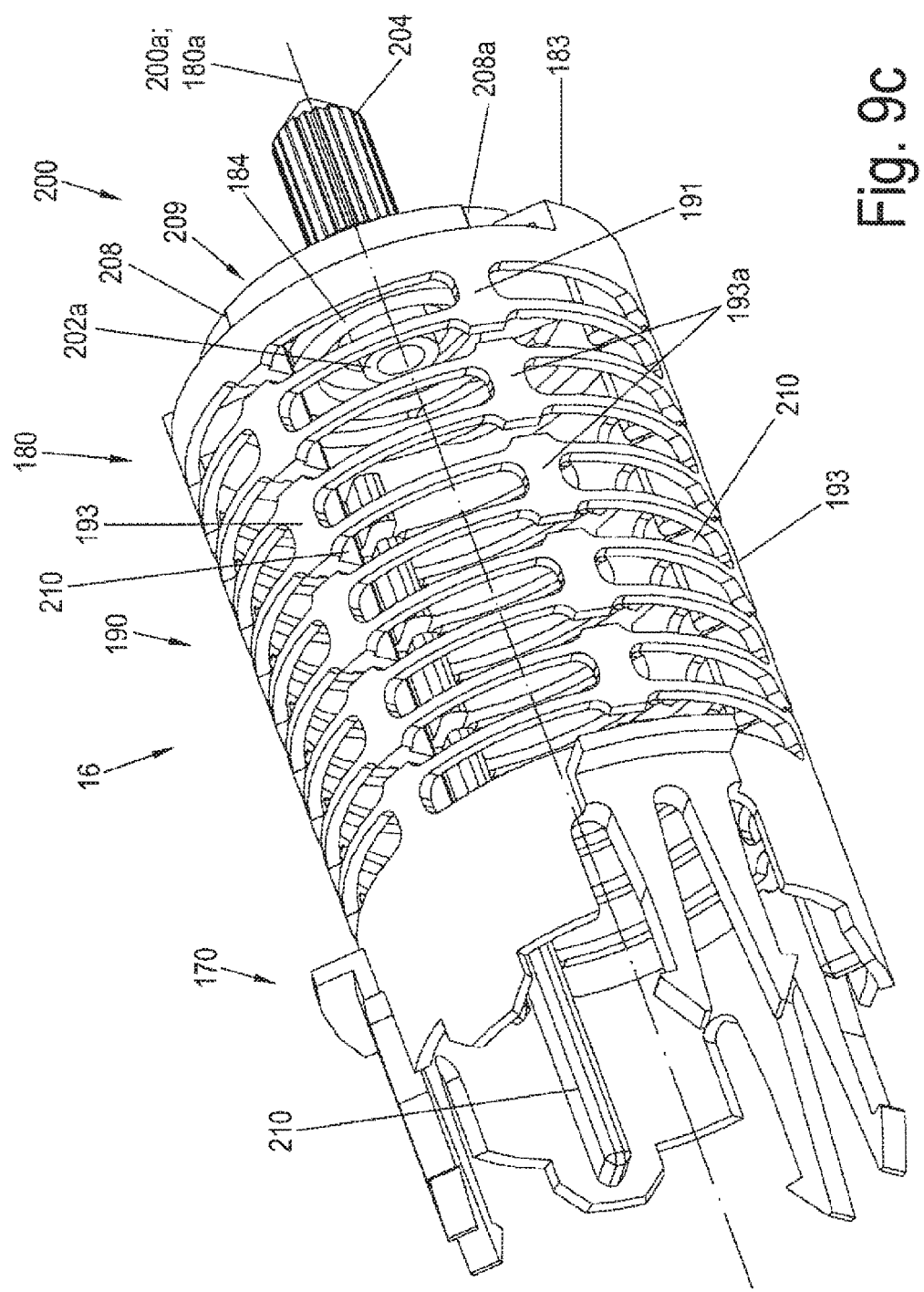

SENSOR DEVICE AND DISC BRAKE HAVING A SENSOR DEVICE

CROSS REFERENCE TO RELATED APPLICATIONS

This application is a continuation of PCT International Application No. PCT/EP2015/050735, filed Jan. 16, 2015, which claims priority under 35 U.S.C. § 119 from German Patent Application No. 10 2014 100 562.7, filed Jan. 20, 2014, the entire disclosures of which are herein expressly incorporated by reference.

BACKGROUND AND SUMMARY OF THE INVENTION

The invention relates to a sensor apparatus for a disc brake, in particular for a motor vehicle. The invention also relates to a disc brake having a sensor apparatus of said type.

Sensor apparatuses of said type are used for detecting a state of wear of brake pads and brake disc of a disc brake. Numerous different types are known. The document DE 4212387 B4 is mentioned in order to illustrate one example. Said document describes a pad wear detector for a compressed-air-actuated disc brake.

The sensor apparatus may be connected to a monitoring system which can detect the state of pad wear and the actuating travel of the brake.

Disc brakes of said type are normally actuated using compressed air and equipped with automatically acting, mechanical wear-compensating readjustment apparatuses. Said wear-compensating readjustment apparatuses operate very reliably and reduce an air clearance that has become too large. They are known in a variety of embodiments, such as for example mechanical readjusters with automatic adjustment to a biting point. Here, upon every brake actuation, the readjustment apparatus is activated, for example by way of a brake-application element of a brake-application apparatus of the disc brake. In the event of wear of brake pads and brake disc, an automatic readjustment of the pads is performed by way of the wear-compensating readjustment apparatus, for example by way of an adjustment movement of the threaded spindles that are variable in position.

An example of a readjustment apparatus is described by document DE 102004037771 A1. Here, a drive rotational movement is transmitted for example from a torque-limiting device, for example with a ball ramp, via a continuously acting clutch (slipping clutch) to a threaded spindle.

Owing to the ever-increasing demands for reducing the number of parts and therefore costs, wherein at the same time quality and benefit should be not only maintained but increased, and furthermore increased precision is demanded despite different and greater tolerances under different usage conditions, there is a corresponding demand for an improved sensor apparatus.

It is the object of the present invention to provide an improved sensor apparatus. It is a further object to provide an improved disc brake.

The object is achieved by way of a sensor apparatus for detecting wear of brake pads and a brake disc of a disc brake, in particular for a motor vehicle, having a sensor device and having a transmission unit. The sensor device has at least one encoder and a sensor gearing which is coupled to the at least one encoder and which has at least one gearing input. The transmission unit is coupled to the gearing input and, for the transmission of a rotational movement associated with the wear to be detected, is designed for coupling to a threaded spindle of the disc brake for association. The transmission unit comprises a drive-input sleeve for rotationally conjoint coupling to the threaded spindle, a drive-output sleeve which is coupled to the drive-input sleeve, at least one spring element, and a driver, which is coupled rotationally conjointly to the drive-output sleeve, for rotationally conjoint coupling to the gearing input.

The object is also achieved by way of a disc brake, in particular for a motor vehicle, having at least two spindle units with in each case one threaded spindle, having a brake-application apparatus with a spreading mechanism, preferably with a brake rotary lever which interacts with a bridge into which the threaded spindles are screwed, having a wear-compensating readjustment apparatus which has at least one mechanical readjustment device which is preferably arranged around and coupled to a threaded spindle and coupled to the spreading mechanism, preferably to the brake rotary lever, having a synchronizing unit which has synchronizing wheels and a synchronizing device which couples the synchronizing wheels. Each threaded spindle is rotationally conjointly coupled to, in each case, one of the synchronizing wheels. A sensor apparatus is provided for detecting wear of brake pads and the brake disc, having a sensor device and having a transmission unit. The sensor device has at least one encoder and a sensor gearing which is coupled to the at least one encoder and which has at least one gearing input. The transmission unit is coupled to the gearing input and, for the transmission of a rotational movement associated with the wear to be detected, is designed for coupling to a threaded spindle of the disc brake for association. The transmission unit comprises a drive-input sleeve for rotationally conjoint coupling to the threaded spindle, a drive-output sleeve which is coupled to the drive-input sleeve, at least one spring element, and a driver, which is coupled rotationally conjointly to the drive-output sleeve, for rotationally conjoint coupling to the gearing input. The end of the drive-input sleeve of the transmission unit is connected rotationally conjointly to the threaded spindle, directly or indirectly via one or more intermediate components, by way of the synchronizing wheel which is coupled rotationally conjointly to the threaded spindle.

A sensor apparatus for detecting wear of brake pads and brake disc of a disc brake is provided, wherein a transmission unit having a drive-input sleeve, a drive-output sleeve, a spring element and a driver is provided. The transmission unit makes it possible for the variable to be detected for the wear to be transmitted to a sensor device with increased precision in relation to the prior art.

A sensor device according to the invention for detecting wear of brake pads and brake disc of a disc brake, in particular for a motor vehicle, having a sensor device and having a transmission unit, wherein the sensor device has at least one encoder and a sensor gearing which is coupled to the at least one encoder and which has at least one gearing input, wherein the transmission unit is coupled to the gearing input and, for the transmission of a rotational movement associated with the wear to be detected, is designed for coupling to a threaded spindle of the disc brake for association. The transmission unit comprises a drive-input sleeve for rotationally conjoint coupling to the threaded spindle, a drive-output sleeve which is coupled to the drive-input sleeve, at least one spring element, and a driver, which is coupled rotationally conjointly to the drive-output sleeve, for rotationally conjoint coupling to the gearing input.

A disc brake according to the invention, in particular for a motor vehicle, having at least two spindle units with in each case one threaded spindle, having a brake-application apparatus with a spreading mechanism, preferably with a brake rotary lever which interacts with a bridge into which the threaded spindles are screwed, having a wear-compensating readjustment apparatus which has at least one mechanical readjustment device which is preferably arranged around and coupled to a threaded spindle and coupled to the spreading mechanism, preferably to the brake rotary lever, having a synchronizing unit which has synchronizing wheels and a synchronizing means which couples the synchronizing wheels, wherein each threaded spindle is rotationally conjointly coupled to in each case one of the synchronizing wheels, is equipped with the sensor apparatus according to the invention. Here, the end of the drive-input sleeve of the transmission unit is connected rotationally conjointly to the threaded spindle, directly or indirectly via one or more intermediate components, by way of the synchronizing wheel which is coupled rotationally conjointly to the threaded spindle.

The rotationally conjoint coupling of the drive-input sleeve to the threaded spindle may be formed directly. The coupling may however also be formed indirectly via one or more intermediate components.

Here, the drive-input sleeve of the transmission unit is pushed over the threaded spindle and connected to the synchronizing wheel. The rotational movement of the threaded spindle is transmitted in play-free fashion to the drive-input sleeve, from the latter indirectly or directly to the drive-output sleeve, and from the latter via the driver to the sensor device. The transmission unit offers the advantage that it can compensate various movements of the threaded spindle(s), and tilting of the bridge during actuation of the brake, in a simple manner.

In one embodiment, it is provided that the drive-output sleeve is coupled rotationally conjointly to the drive-input sleeve and is arranged on said drive-input sleeve so as to be axially displaceable relative to the drive-input sleeve. It is thus possible for the rotation of the drive-input sleeve effected by the rotation of the spindle to be transmitted to the drive-output sleeve, wherein, at the same time, an axial displacement of the drive-output sleeve relative to the drive-input sleeve is possible.

In a further embodiment, the drive-input sleeve has a hollow cylindrical body, on the outer surface of which there is arranged an external profile as a toothing of a shaft-hub connection for engagement with an internal profile, which corresponds to the external profile, of the drive-output sleeve. The external profile of the drive-input sleeve and the internal profile of the drive-output sleeve may for example be in the form of a serration, toothed-shaft toothing, spline-shaft toothing, or a polygonal profile. Said profiles are conventional shaft-hub connections, and exhibit little play.

It is furthermore provided that an end section of the drive-input sleeve is equipped a drive-input section with a drive-input profile for direct coupling or indirect coupling via one or more intermediate components to the threaded spindle, wherein the drive-input profile is in the form of a toothing of a shaft-hub connection and, at the associated end of the end section, is delimited by a flange. Said drive-input profile is also an external profile, and may also be in the form of a serration, toothed-shaft toothing, spline-shaft toothing, or a polygonal profile. The flange offers the advantage that, by way of said flange, axial fixing of the drive sleeve for example in an internal groove is made possible.

In another embodiment, the drive-input section is connected by way of a shoulder to the body of the drive-input sleeve and has a larger outer diameter than the body. In this way, a simple assembly process can be made possible.

In yet another embodiment, the at least one spring element is arranged between the shoulder of the drive-input sleeve and a rim of the drive-output sleeve.

Alternatively or in addition, the at least one spring element may be arranged between a face side of the drive-input sleeve and a base of the drive-output sleeve.

It is thus advantageously possible for a preload force to act on the drive-output sleeve at all times, which preload force pushes the drive-output sleeve with the driver into the gearing input of the sensor device at all times. The at least one spring element may for example be in the form of a compression spring. Combinations of different or multiple spring elements are also possible.

A further embodiment provides that an end, which is averted from the drive-input sleeve, of the drive-output sleeve is closed off by way of a base which has an opening with an opening profile. Said opening profile may also be a shaft-hub connection, for example a serration. Simple coupling to the driver is thus possible.

In a further embodiment, the driver comprises a body which is connected to an input section and to an output section, wherein the input section has, for coupling to the opening profile of the drive-output sleeve, an external profile which corresponds to the opening profile, and wherein the output section has, for coupling to the gearing input of the sensor device, an external profile which corresponds to an internal profile of the gearing input. The driver can thus be plugged together with the drive-output sleeve and the gearing input in a simple manner during the assembly of the transmission unit. Furthermore, the driver can, with a particular embodiment of its body, compensate an axial offset between a sensor axis of the gearing input, which, like the sensor device, is arranged positionally fixed by way of its housing in the brake caliper, and a central axis of the drive-output sleeve. The functionality of the axial offset may also be integrated in the drive-output sleeve and/or in the sensor gearing.

In another embodiment, the drive-input sleeve is equipped with at least one axially extending slot proceeding from the end which is provided for coupling to the threaded spindle, which slot is formed as a recess in the body of the drive-input sleeve.

Alternatively, the drive-input sleeve may be equipped with at least two axially extending slots proceeding from the end which is provided for coupling to the threaded spindle, which slots are formed as recesses into the body of the drive-input sleeve and, between them, form two holding sections.

In this way, it is advantageously made possible for that end region of the drive-input sleeve which is provided for direct or indirect coupling to the threaded spindle to be easily compressed in order to establish the coupling during the installation process.

Here, it is advantageous if the drive-input sleeve and the drive-output sleeve are produced from an elastic and ductile material. The sleeves of the transmission unit may then act in the manner of a Cardan joint between the input of rotation into the drive-input sleeve and the gearing input.

It is provided that the synchronizing wheel of the disc brake has a ring-shaped transmission section with, arranged on the inner wall thereof, a drive-output profile which corresponds to, and engages with, the drive-input profile of the end of the drive-input sleeve of the transmission unit. In this way, indirect coupling of the drive-output sleeve by way of the synchronizing wheel which is connected rotationally conjointly to the gearing spindle is possible. The threaded spindle thus requires no modification; only the synchronizing wheel is adapted for said coupling to the transmission unit.

The drive-output profile of the synchronizing wheel and the drive-input profile of the drive-input sleeve may be in the form of a serration, toothed-shaft toothing, spline-shaft toothing, or polygonal profile.

In one embodiment, in the transmission section, at its pad-side inner end behind the drive-output profile, there is formed an internal groove for receiving the flange of the drive-input sleeve of the transmission unit, wherein an internal diameter of the internal groove is larger than an internal diameter of the transmission section. The pressed-together end region with the flange can thus be easily inserted into the transmission section of the synchronizing wheel, wherein, when released, the flange is received in the internal groove and generates axial fixing of the drive-input sleeve in the synchronizing wheel. At the same time, the drive-output profile of the synchronizing wheel and the drive-input profile of the drive-input sleeve are in engagement, whereby the drive-input sleeve is coupled by way of the synchronizing wheel to the threaded spindle.

In a further embodiment, it is provided that the internal groove has a greater axial length than the flange of the drive-input sleeve. It is hereby possible for an angle between the central axis of the drive-input sleeve and the central axis of the synchronizing wheel and the threaded spindle to be represented or compensated.

In an alternative embodiment of the sensor apparatus, it is provided that the drive-output sleeve is coupled rotationally rigidly to the drive-input sleeve by way of the spring element, and is arranged so as to be axially movable relative to the drive-input sleeve by way of the spring element. This yields a simple construction.

In one embodiment, the drive-output sleeve and the drive-input sleeve can be installed with an axial preload relative to one another by way of the spring element. It is thus possible for the spring element to be used for two functions.

In another embodiment, the spring element comprises spring arms and spring arm connectors and is connected, by way of spring arm holders at each end of the spring element, respectively to the drive-input sleeve and to the drive-output sleeve. This permits a simple connection.

In yet another embodiment, it is provided that the spring arms, spring arm connectors and spring arm holders of the spring element form rings around a central axis of the spring element, wherein the rings are arranged so as to be spaced apart from one another in a longitudinal direction of the spring element. Furthermore, the spring arm connectors and spring arm holders connect the spring arms of the rings to one another along the circumference, that is to say tangentially, and connect the rings axially. In this way, it is possible to realize a construction which is not only rotationally rigid but is also axially movable and capable of being axially preloaded.

It is advantageous if the driver is coupled to the drive-output sleeve by way of a connecting section so as to be pivotable from a non-assembled state into an assembled state. In this way, firstly, the driver can be provided so as to be captively retained, and secondly, positively guided assembly is possible, with incorrect installation being ruled out.

Furthermore, it is advantageous here for the drive-input sleeve, the drive-output sleeve, the spring element and the driver to be produced in one piece.

A transmission unit is thus realized which advantageously exhibits little play and is rotationally rigid. It can thus transmit a rotation about its longitudinal axis and simultaneously permit an axial offset, incorrect angular positioning and an axial stroke of the components to be connected. Furthermore, an axial preload between the two components to be connected is ensured.

The disc brake may be actuated using compressed air.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows a schematic perspective view of a drive-input sleeve:

FIGS. 7-7a show schematic perspective views of a drive-output sleeve;

DETAILED DESCRIPTION OF THE DRAWINGS

Figure 1:
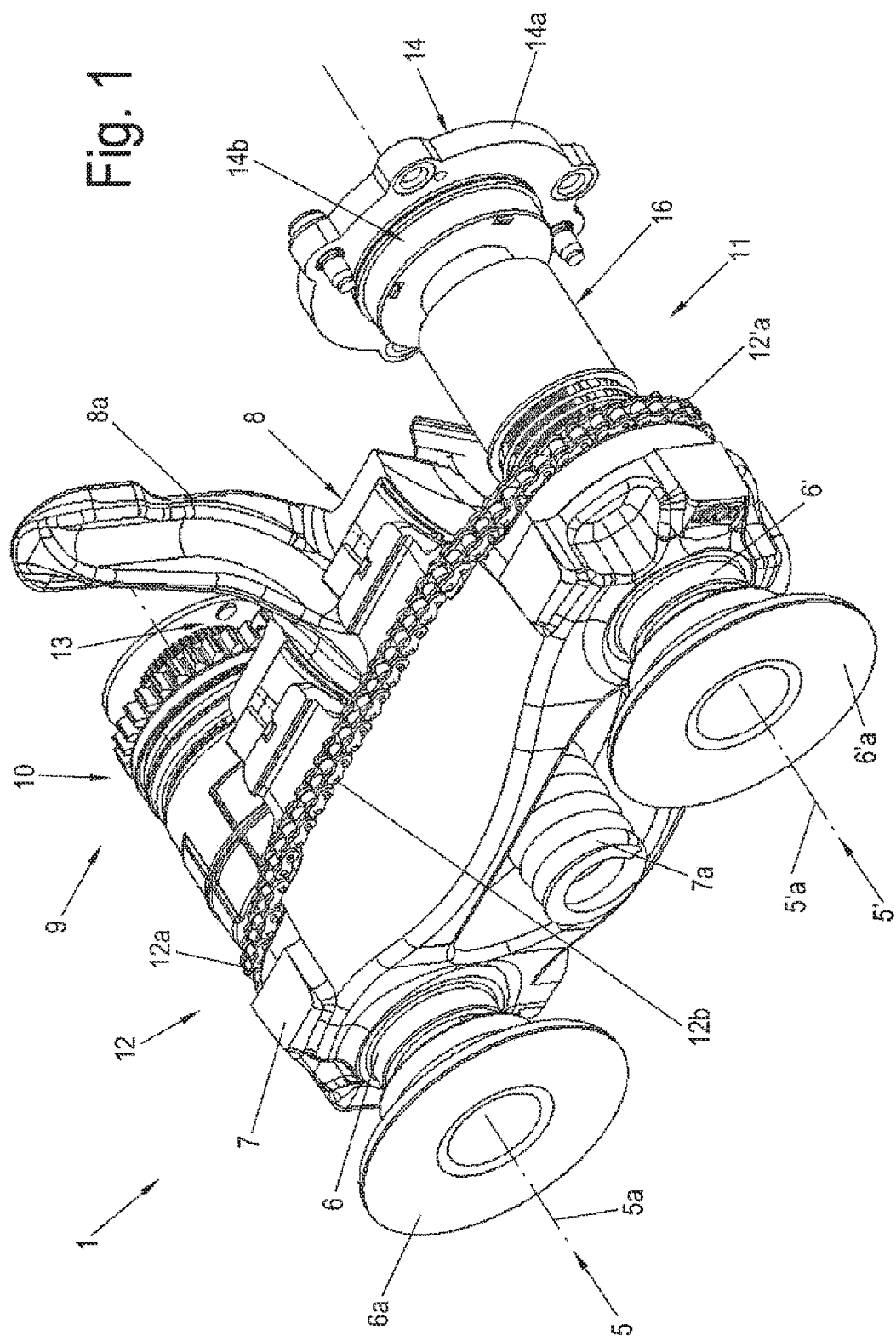
FIG. 1 shows a schematic perspective view of an exemplary embodiment of a disc brake according to the invention having a sensor apparatus according to the invention.
Figure 2:
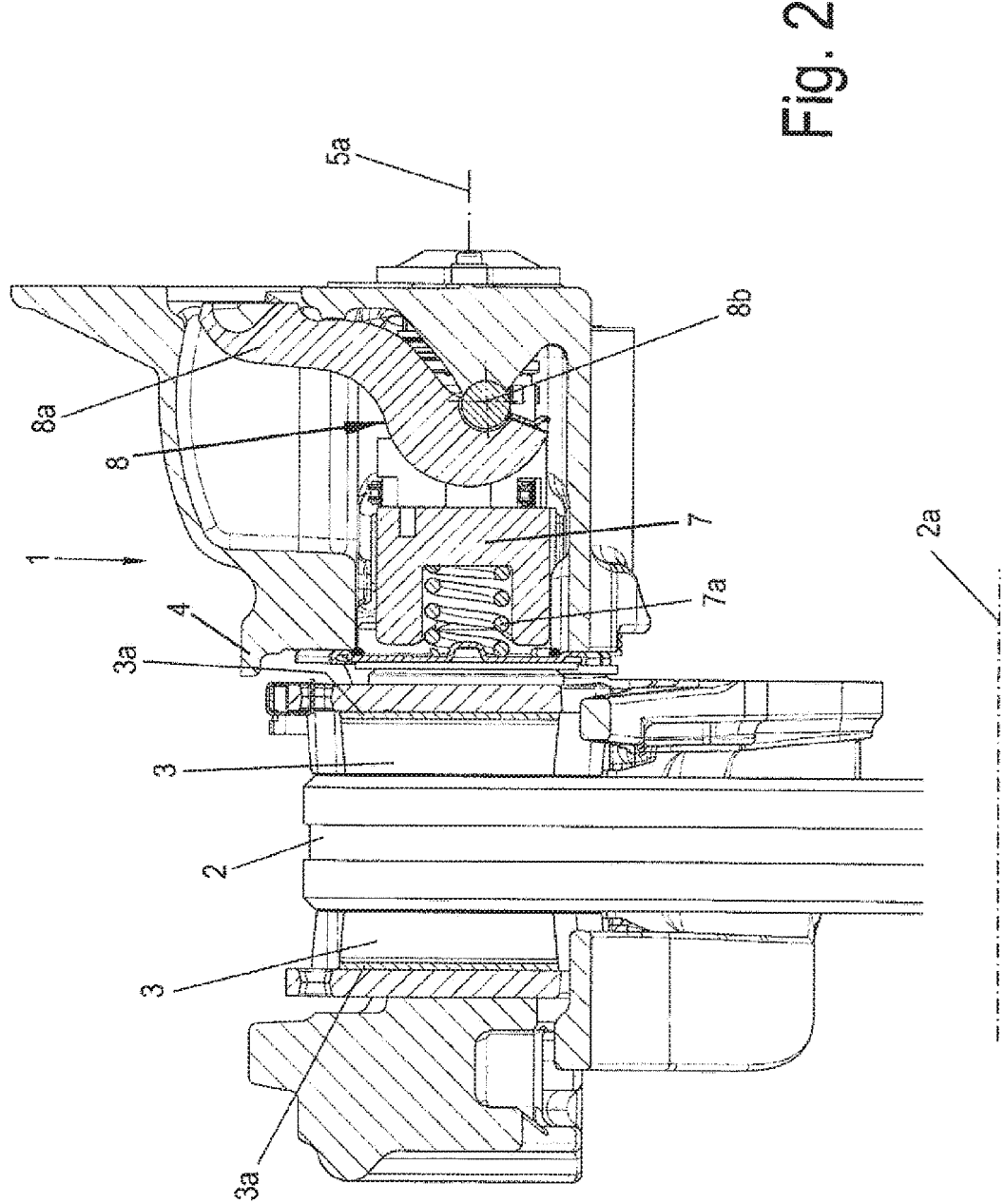
FIG. 2 shows a schematic sectional view of the exemplary embodiment as per FIG. 1.
Figure 3:
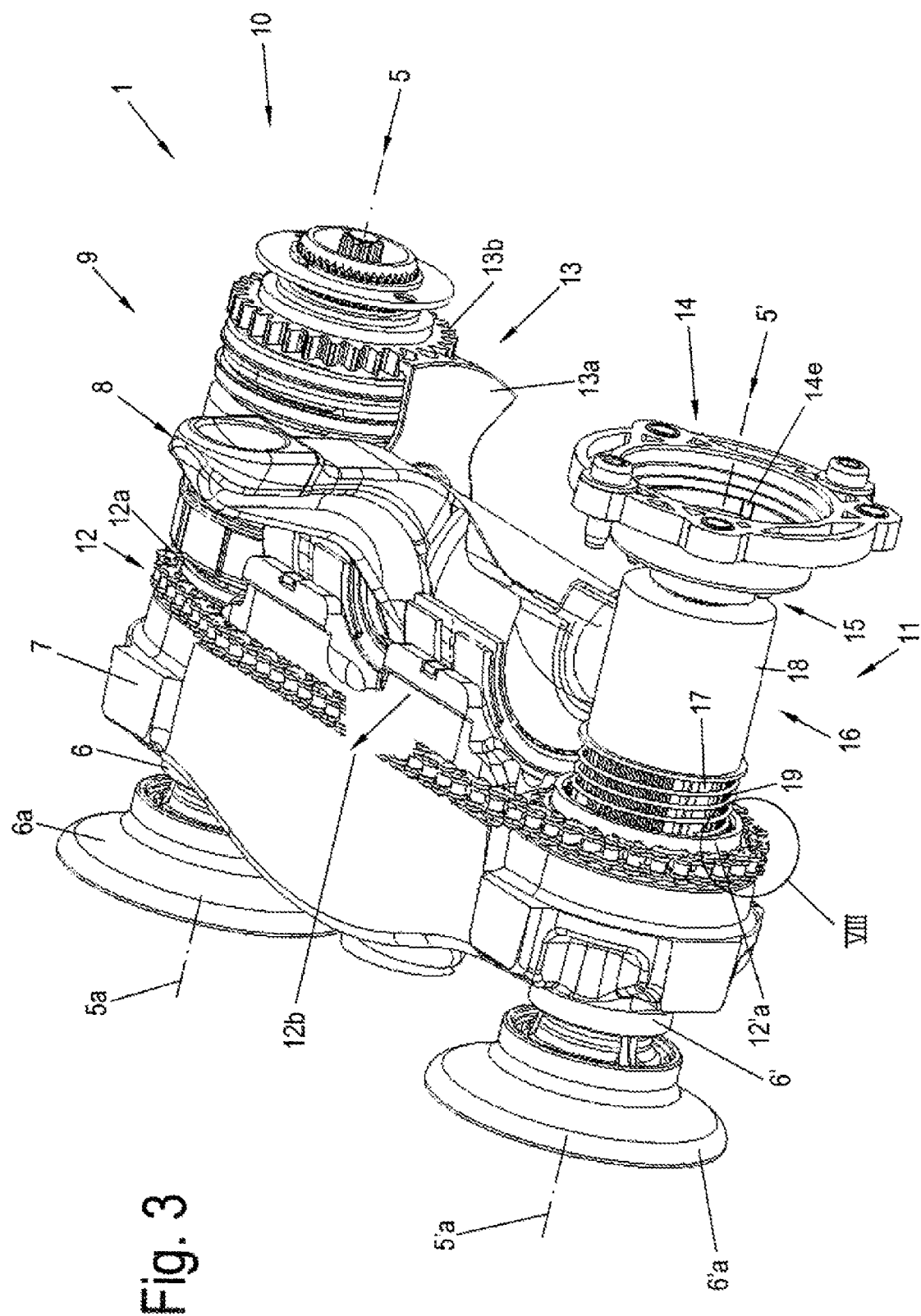
FIG. 3 shows a further schematic perspective view of the exemplary embodiment as per FIG. 1.

FIG. 1 shows a schematic perspective view of an exemplary embodiment of a disc brake 1 according to the invention having a sensor apparatus according to the invention. FIG. 2 shows a schematic sectional view of the exemplary embodiment illustrated in FIG. 1. FIG. 3 shows a further schematic perspective view of the exemplary embodiment as per FIG. 1 from a different viewing angle.

The disc brake 1 is in this case illustrated as a so-called two-plunger brake. It has a brake caliper 4 which engages over a brake disc 2. The brake disc 2 is rotatable about a brake disc axis 2a, wherein, on both sides of the brake disc 2, in each case one brake pad 3 is arranged on a brake pad carrier 3a. Furthermore, the disc brake 1 is formed with a brake-application apparatus, which in this case is formed with a brake rotary lever 8, for the application of the disc brake 1. The brake rotary lever 8 is also referred to as a spreading mechanism, is part of the brake-application apparatus, and has a lever arm 8a which can be actuated for example by a compressed-air brake cylinder. The brake rotary lever 8 is mounted, by way of a bearing drum which is not illustrated in any more detail, on the brake caliper 4 so as to be pivotable about a lever pivot axis 8b.

The perspective view in FIG. 1 is from the so-called pad side, whereas the perspective view of FIG. 3 is from the so-called application side.

The expression "pad side" is to be understood to mean the side which points toward the brake pads 3 of the brake. The expression "application-side" refers to the opposite side, which points toward the brake-application apparatus and away from the pad side.

A bridge 7 is in contact with the brake rotary lever 8 and can be actuated toward the brake disc 2 and back, in the direction of the brake disc axis 2a, during the application and release of the brake. During the release of the brake, the bridge 7 is pushed back into its initial position by a restoring spring 7a. At its ends, the bridge 7 is coupled in each case to a spindle unit 5, 5' by way of in each case one threaded spindle 6, 6'. Each threaded spindle 6, 6' has an external thread by way of which each threaded spindle 6, 6' is screwed into an associated internal thread of the bridge 7. Each spindle unit 5, 5' has an axis 5a, 5'a, wherein the axis 5a of the spindle unit 5 can be referred to as readjuster axis 5a, and the axis 5'a of the spindle unit 5' can be referred to as driver axis 5'a. The readjuster axis 5a and the driver axis 5'a run parallel and lie parallel to the brake disc axis 2a. The lever pivot axis 9a lies at right angles to the brake disc axis 2a and at right angles to the readjuster axis 5a and the driver axis 5'a.

Those ends of the spindle units 5, 5' which are arranged on the left in FIG. 1 and FIG. 3 and which point toward the brake disc 2 are equipped in each case with a thrust piece 6, 6'a. The thrust pieces 6, 6'a are in contact with a brake pad carrier 3a of an application-side brake pad 3, which is arranged on one side of the brake disc 2 of the disc brake 1. On the other side of the brake disc 2, a further brake pad 3 with brake pad carrier 3a is fixed in the brake caliper 4. Said brake pad 3 is also referred to as reaction-side brake pad 3. This is illustrated in FIG. 2. The brake caliper 4 may be, for example, a sliding caliper.

A spacing between brake pad 3 and the brake disc 2 is referred to as air clearance. During a braking process, upon actuation of the brake disc 1, the air clearance is firstly overcome by virtue of the brake pad 3 being adjusted, by way of the bridge 7 that is actuated by the brake lever 9, toward the brake disc 2 of the disc brake 1. The air clearance becomes larger as a result of wear of the brake pads 3 and of the brake disc 2.

The expression "biting point" is the point at which the brake pad 3 bears against the brake disc 2 of the disc brake 1. The biting point is, during the brake-application process, reached after the air clearance has been overcome. A further brake-application movement then give rise to a braking operation as a result of the brake pad 3 being pressed against the brake disc 2. This self-evidently also applies to the reaction-side brake pad 3. A release of the brake-application apparatus gives rise to a reversal of the above-described process.

The disc brake 1 furthermore has a wear-compensating readjustment apparatus 9 which serves for the readjustment of the brake pads 3 in the event of wear in order to restore the original air clearance.

The wear-compensating readjustment apparatus 9 comprises a readjustment device 10, a driver device 11 and a synchronizing unit 12 for the coupling of the readjustment device 10 and driver device 11.

The readjustment device 10 will not be discussed in any more detail here, engages around the threaded spindle 6 from the outside and is coupled to said threaded spindle. A longitudinal axis of the readjustment device 10 forms the readjuster axis 5a.

By way of the synchronizing unit 12, the threaded spindle 6 is coupled to the threaded spindle 6' of the driver device 11 such that a rotation of the threaded spindle 6 effected by the readjustment device 10 is transmitted synchronously to the driver device 11 and to the threaded spindle 6' connected rotationally conjointly thereto. The threaded spindle 6 is connected rotationally conjointly to a synchronizing wheel 12a, in this case a sprocket, of the synchronizing unit 12. The synchronizing wheel 12a is connected by way of a synchronizing means 12b, in this case a chain, to a further synchronizing wheel 12'a, which is coupled rotationally conjointly directly or indirectly to the driver II and thus to the threaded spindle 6'. The chain, as synchronizing means 12b, is arranged so as to be guided at the longitudinal side on the bridge 7.

Every brake-application movement of the brake rotary lever 8, in the case of which the brake rotary lever 8 pivots counterclockwise (FIG. 2) about its lever pivot axis 8b, causes the readjustment device 10 to be driven. This is realized by way of a readjuster drive 13 which has an actuator 13a, which is fixedly connected to the brake rotary lever 8, and a readjuster drive element 13b, which is coupled to the readjustment device 10. The actuator 13a and the readjuster drive element 13b are in engagement with one another, as can be seen from FIG. 3.

If, during the brake-application movement of the brake rotary lever 8, no wear is (yet) present, then it is the case, for example by way of an overload clutch of the readjustment device 10, that a drive movement is not transmitted to the threaded spindle 6. However, if wear is present, the drive movement is transmitted to the threaded spindle 6 by the readjustment device 10 in order to readjust the brake pad 3, whereby the air clearance is set to the original value. By way of the synchronizing unit 12, said drive movement of the threaded spindle 6 is transmitted in synchronous fashion to the threaded spindle 6' of the driver device 11. By way of a rotation of the threaded spindles 6, 6' in the respective thread of the bridge 7, the threaded spindles 6, 6' are adjusted in an axial direction, and the rotational movement is thus converted into a linear movement.

The disc brake 1 is equipped with a sensor apparatus. The sensor apparatus comprises a sensor device 14 and a transmission unit 16. The sensor device 14 serves for detecting wear of brake pads 3 and of the brake disc 2. The detection of the wear is performed by way of the detection of the readjustment movement of the threaded spindle 6 or of the threaded spindle 6', which is coupled to the former threaded spindle via the synchronizing unit 12. The transmission unit 16 is provided for transmitting the rotational movement of the threaded spindle 6' to the sensor device 14. The sensor device 14 is formed with an encoder 14e, for example a Hall sensor, a potentiometer or an inductive and/or optical and/or acoustic encoder element. Said encoder is connected to an evaluation unit of a monitoring system which is not shown.

Here, the sensor device 14 is arranged coaxially with respect to the spindle unit 5' and has a sensor housing 14a, which is in this case only partially shown. By way of the sensor housing 14a, the sensor device 14 is attached fixedly, from the brake-application side, to the brake caliper 4 in a manner not illustrated in any more detail. A sensor gearing 14b is arranged in the sensor housing 14a. The sensor gearing 14b is coupled at the brake-application side to the encoder 14e. At the pad side, the sensor gearing 14b is equipped with at least one gearing input 14c (see FIG. 4) which is coupled by way of a sensor drive 15 to the transmission unit 16.

Figure 4:
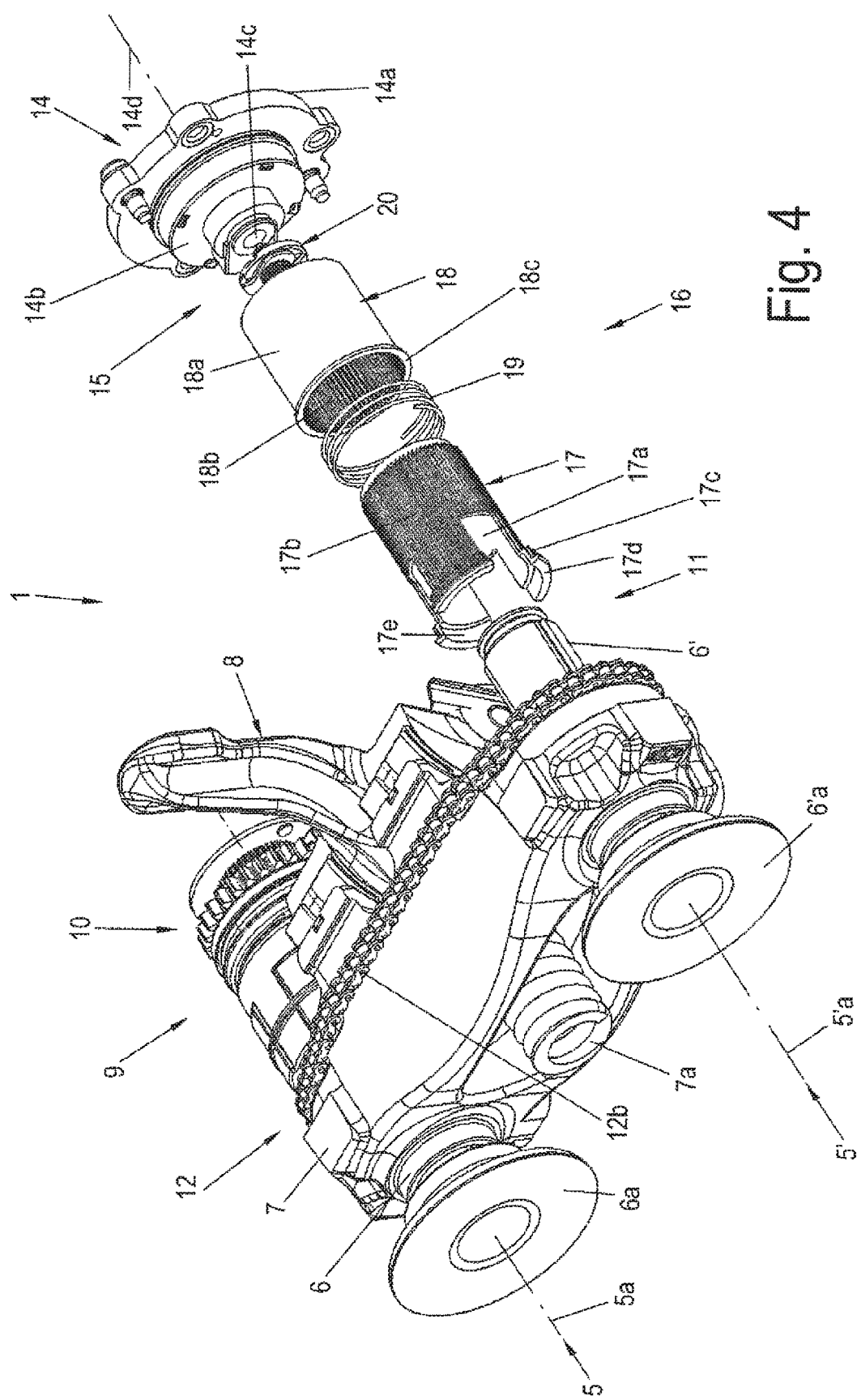
FIGS. 4-5 show schematic perspective views of the exemplary embodiment as per FIG. 1 with exploded illustrations of a transmission unit of the sensor apparatus.
Figure 5:
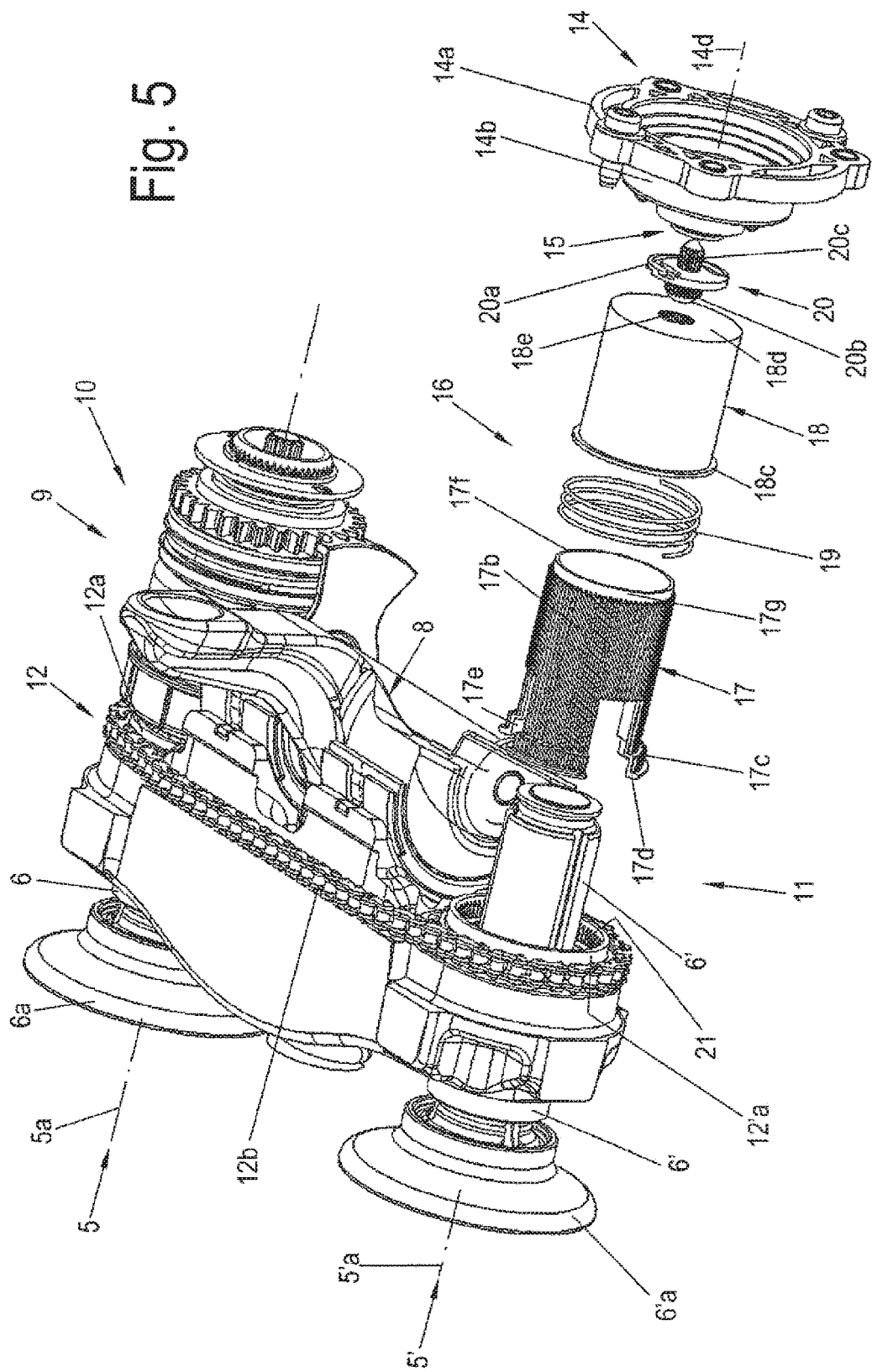

The transmission unit 16 comprises a drive-input sleeve 17, a drive-output sleeve 18, a spring element 19 and a driver 20 (see FIGS. 4 and 5).

The drive sleeve 17 of the transmission unit 16 is pushed over the threaded spindle 6' and is coupled rotationally conjointly to the synchronizing wheel 12'*a* in a manner that will be discussed in more detail below. The drive-output sleeve 18 is pushed over the drive-input sleeve 17 and is coupled likewise rotationally conjointly thereto, wherein the drive-output sleeve 18 is axially displaceable on the drive-input sleeve 17. Arranged between a pad-side end of the drive-output sleeve 18 and the pad-side end of the drive-input sleeve 17 is the spring element 19, which in this case is in the form of a compression spring, exerts an axial preload force on the drive-output sleeve 18, and forces the latter in the direction of the sensor device 14. The application-side end of the drive-output sleeve 18 is coupled by way of the driver 20 (FIGS. 4 and 5) to the sensor device 14.

This will now be described in detail in conjunction with FIGS. 4 and 5.

FIG. 4 is a schematic perspective view of the exemplary embodiment as per FIG. 1 with an exploded illustration of the transmission unit 16. The view is from the pad side. A further schematic perspective view in this regard, with exploded illustration of the transmission unit 16, is shown in FIG. 5, from the application side.

The threaded spindles 6 and 6' are in the form of solid shafts, as can be seen in the case of the threaded spindle 6', which projects out of the bridge 7 at the application side through the synchronizing wheel 12'*a* mounted in the bridge 7.

The drive-input sleeve 17 has a circular hollow cylindrical body 17*a*, on the outer surface of which there is arranged an external profile 17*b*. The external profile 17*b* is a toothing of a shaft-hub connection, for example a serration. Other toothing types are self-evidently also possible, for example toothed-shaft profile, spline-shaft profile, polygonal profile and the like.

On a pad-side end section, the drive-input sleeve is equipped with a drive-input profile 17*c*, which is also in the form of a toothing of a shaft-hub connection. Said drive-input profile 17*c* is delimited toward the pad-side end by a flange 17*d* which extends radially outward beyond the drive-input profile 17*c*. The drive-input profile 17*c* is arranged on a drive-input section 17*e* which is connected to the body 17*a* and which has a larger outer diameter than the body 17*a*. Proceeding from the pad-side end of the drive-input sleeve 17, the drive-input sleeve 17 is in this case equipped with slots 17*i*, which will be discussed in more detail below.

An application-side end of the drive-input sleeve 17 has a face side 17*f*. A profile-free face section 17*g* is arranged between an end of the external profile 17*b* and the face side 17*f*.

Figure 8:
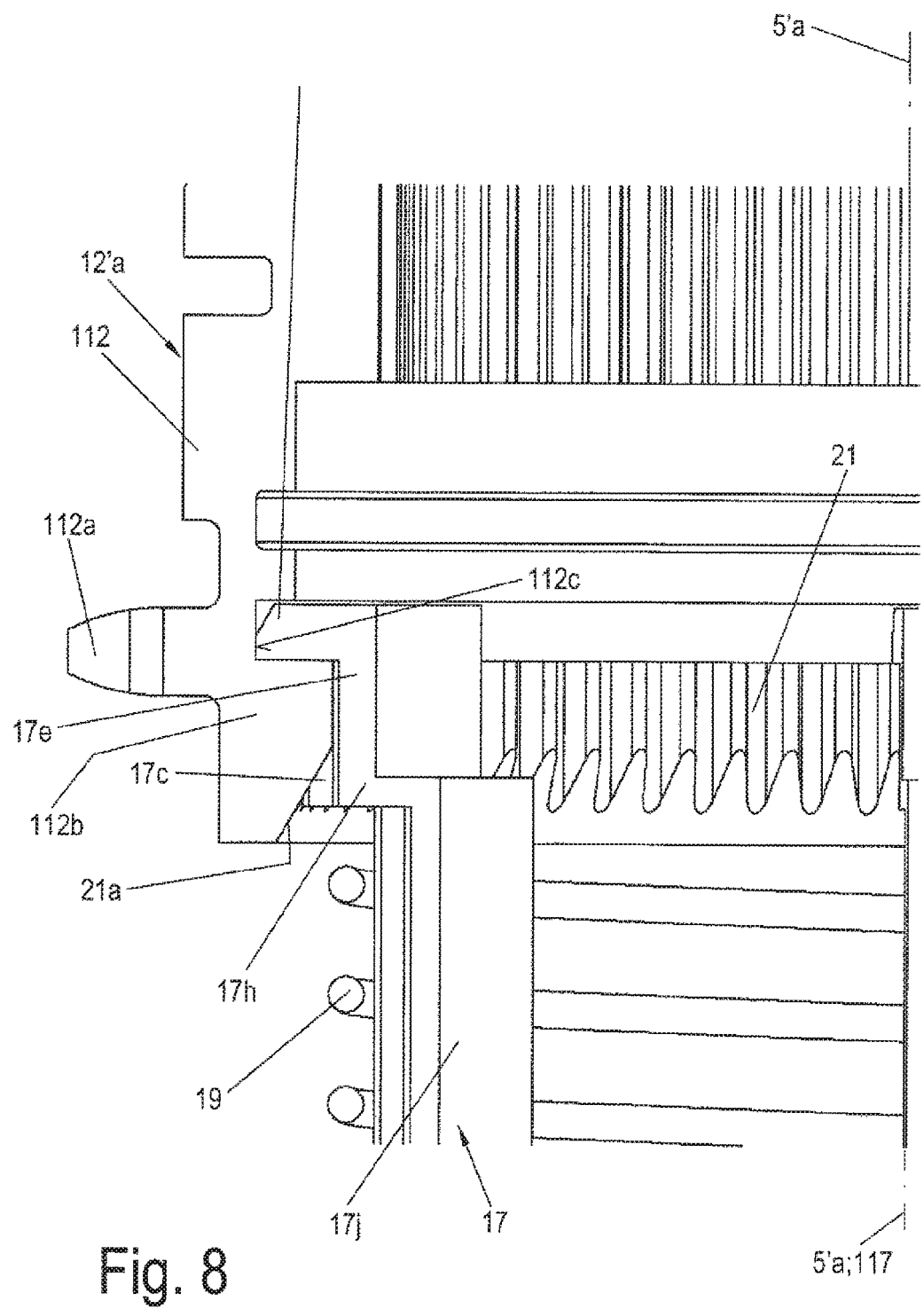
FIG. 8 shows an enlarged schematic sectional view of the region VIII from FIG. 3.

The drive-input sleeve 17 of the transmission unit 16 is, in the assembled state, pushed over the projecting application-side section of the threaded spindle 6' such that the pad-side flange 17*d* is situated in an internal groove 112*c* (see FIG. 8) of the synchronizing wheel 12'*a*, and such that the drive-input profile 17*c* is in rotationally conjoint engagement with a drive-output profile 21 (see also FIG. 8). This will be discussed in more detail below in conjunction with FIG. 8.

The drive-output sleeve 18 has a body 18*a* with an internal profile 18*b* which is in the form of a toothing of a shaft-hub connection, which toothing corresponds to the toothing of the external profile 17*b* of the drive-input sleeve 17. A pad-side end of the drive-output sleeve 18 is equipped with a flange-like rim 18*c*, which projects radially outward from the outer surface of the body 18*a* and which, by way of its pad-side face surface, forms a support for the spring element 19. An application-side end, averted from the drive-input sleeve 17, of the drive-output sleeve 18 is closed off by way of a base 18*d*, which has an opening with an opening profile 18*e*.

The driver 20 is formed with a body 20*a* which can compensate an axial offset and which therefore has a corresponding elastic construction, which will not be discussed in any more detail here. Such an axial offset may arise between a central axis 118 of the drive-output sleeve 18 (see FIGS. 7 and 7*a*) and a sensor axis 14*d* of a gearing input 14*c* of the sensor device 14.

At the pad side, the body 20*a* is connected to a peg-like input section 20*b*, wherein a further peg-like output section 20*c* is connected at the application side to the body 20*a*. The input section 20*b* extends in an axial direction toward the pad side and is equipped with an external profile, for example a serration, which corresponds to the opening profile 18*e* of the opening of the base 18*d* of the drive-output sleeve 18.

The output section 20*c* extends, at the application side, in an axial direction toward the sensor device 14 and is equipped with an external profile, for example a serration, which corresponds to an internal profile of the gearing input 14*c* of the sensor gearing 14*b* of the sensor device 14.

In the assembled state of the transmission unit 16, the driver 20 is inserted by way of its input section 20*b* in the opening with the opening profile 18*e* of the drive-output sleeve 18 and is thus coupled in rotationally conjoint but axially displaceable fashion to the drive-output sleeve 18. Furthermore, the driver 20 is inserted by way of its output section 20*c* in the internal profile of the gearing input 14*c* of the sensor device 14, wherein a rotationally conjoint and axially displaceable coupling between the driver 20, and thus the transmission unit 16, and the sensor gearing 14*b* of the sensor device 14 is realized.

FIG. 6 illustrates a schematic perspective view of the drive-input sleeve 17.

The drive-input sleeve 17 has already been described above. In the enlarged illustration shown in FIG. 6, it is possible to see further details which will additionally be discussed in more detail.

The external profile 17*b* has, on the face section 17*g* at the application side, rounded ends of the profiling which permit simplified assembly, that is to say easy engagement of the internal profile 18*b* of the drive-output sleeve 18 during the pushing of the drive-output sleeve 18 onto the drive-input sleeve 17.

The external profile 17*b* ends at the pad side at a shoulder 17*h* which extends radially outward and which is connected to the drive-input section 17*e*.

As viewed in a projection onto a plane, a slot 17*i* is of rectangular form. The long sides thereof run parallel to a central axis 117 of the drive-input sleeve 17 and extend axially over a length which corresponds approximately to half of the overall length of the drive-input sleeve 17. The width of a slot 17*i* (again in the projection onto a plane) corresponds approximately to half of the length of the slot 17*i*. It is for example the case that three slots 17*i* are provided, which are formed as recesses into the body 17*a* of the drive-input sleeve 17 and which divide the pad-side half of the drive-input sleeve 17 into three holding sections 17*j*. The external profile 17*b* ends in the region of the slot 17*i* directly at the narrow sides of the slots 17*i*.

It is possible for at least one slot 17*i* to be provided. In this exemplary embodiment, three slots 17*i* are provided.

FIG. 7 shows a schematic perspective view of the drive-output sleeve 18 from the pad side, wherein FIG. 7a shows a schematic perspective view of the drive-output sleeve from the application side.

The drive-output sleeve 18 has already been discussed above. Yet further details will be described in the enlarged views in FIGS. 7 and 7a.

The body 18a is of pot-shaped form as a circular hollow cylinder with the base 18d, and has a central axis 118. The internal profile 18b is formed on the inner wall over the entire length of the drive-output sleeve 18. The opening which is concentric with respect to the central axis 118 is provided in the base 18d. The opening profile 18e of the opening is formed into the rim of the opening, and is for example a serration.

The drive-input sleeve 17 and the drive-output sleeve 18 are produced from an elastic and ductile material, whereby the relative movements between the synchronizing wheel 12'a and the gearing input 14c of the sensor gearing 14b of the sensor device 14 can be compensated.

Finally, FIG. 8 shows an enlarged schematic sectional view of the region VIII from FIG. 3.

FIG. 8 illustrates, on an enlarged scale, the fastening of the pad-side end of the drive-input sleeve 17 in the synchronizing wheel 12'a, which is associated with the driver device 11 and with the threaded spindle 6'.

The synchronizing wheel 12'a is, in a manner not shown in any more detail, connected rotationally conjointly to the threaded spindle 6', wherein, at the same time, an axial relative movement arising as a result of the rotation of the threaded spindle 6' during the readjustment in the bridge 7 is made possible.

The synchronizing wheel 12'a has a synchronizing wheel body 112, on the outer surface of which there is formed a toothing 112a, in this case a chain toothing, for interaction with the synchronizing means 12b, in this case a chain. The toothing 112a is connected to a ring-shaped transmission section 112b arranged under said toothing at the application side, which transmission section is, on its inner wall, equipped with the drive-output profile 21 as a shaft-hub connection, for example a serration. The drive-output profile 21 corresponds to the drive-input profile 17c of the drive-input sleeve 17.

Furthermore, in a connecting section between the transmission section 112b and the toothing 112a, that is to say at the pad-side inner end of the transmission section 112b, an internal groove 112c is formed in behind the drive-output profile 21, the internal diameter of which internal groove is larger than an internal diameter of the transmission section 112b.

Owing to the slots 17i in the drive-input sleeve 17, it is possible, during the assembly of the transmission unit 16, for the holding sections 17j to be pushed together during the insertion of the drive-input sleeve 17 such that the drive-input sleeve 17, when being pushed over that section of the threaded spindle 6' which projects on the application side, can be pushed by way of its pad-side end into the transmission section 112b and the internal groove 112c of the synchronizing wheel 12'a. When the pad-side end of the drive-input sleeve 17 has, by way of its flange 17d, reached the inner pad-side end of the transmission section 112b, the holding sections 17j are released again. The holding sections 17j then spring back into their initial position, wherein the flange 17d is received in the internal groove 112c and the drive-input profile 17c of the drive-input sleeve 17 engages with the drive-output profile 21 of the synchronizing wheel 12'a. In its position in the internal groove 112c, the flange 17d effects axial retention of the drive-input sleeve 17 and thus connects the drive-input sleeve 17 to the synchronizing wheel 12'a. The drive-input profile 17c, which is in engagement with the drive-output profile 21 of the synchronizing wheel 12'a, forms a rotationally conjoint connection of the drive-input sleeve 17 to the synchronizing wheel 12'a.

The internal groove 112c has a greater axial length than the flange 17d of the drive-input sleeve 17. It is thus possible for an angle to be realized between the central axis 117 of the drive-input sleeve 17 and the central axis of the synchronizing wheel 12'a, which in this case is the driver axis 5'a.

The flange 17d is equipped, at its front edge, with a bevel. Furthermore, the transmission section 112b is likewise formed, at its application-side circumference, with a bevel. Said two bevels facilitate an insertion of the pad-side end of the drive-input sleeve 17 into the synchronizing wheel 12'a.

Here, the spring element 19 is supported on the shoulder 17h of the drive-input sleeve 17.

A rotation of the threaded spindle 6, for example owing to a readjustment, is transmitted by way of the synchronizing unit 12 to the synchronizing wheel 12'a, which is connected rotationally conjointly to the threaded spindle 6'. The drive-input profile 17c, which is in engagement with the drive-output profile 21 of the synchronizing wheel 12'a, transmits said rotational movement to the drive-input sleeve 17, which in turn transmits the rotational movement via its external profile 17b to the internal profile 18b, which is in engagement with the external profile 17b, of the drive-output sleeve 18, and thus to the drive-output sleeve 18. The rotational movement is thus transmitted from the drive-output sleeve 18 via the opening profile 18c to the driver 20, which transmits the rotational movement to the gearing input 14c of the sensor device 14.

The transmission unit 16 can, by way of the drive-input sleeve 17 and the drive-output sleeve 18, act as a cardan joint between the synchronizing wheel 12'a and the sensor gearing 14b of the sensor device 14. Thus, the transmission unit 16 is capable of solving the following problems:

a) The threaded spindles 6, 6' are subjected to a linear movement upon the actuation of the brake, that is to say during brake application and release. This is compensated by way of the axial displaceability of the drive-input sleeve 17 and drive-output sleeve 18, including the preload force of the spring element 19.

b) The threaded spindles 6, 6' perform a rotational movement about the guide center of the bridge 7 as a result of so-called bridge tilting. Owing to the dimensioning of the internal groove 112c of the synchronizing wheel 12'a and of the flange 17d, which is received in said internal groove, of the drive-input sleeve 17, an angle between central axis 117 of the drive-input sleeve 17 and the central axis of the synchronizing wheel 12'a, which is in this case the driver axis 5'a, can be compensated.

c) The gearing input 14c of the sensor device 14 is positionally fixed because the sensor device 14 is fixedly fastened by way of its housing 14a in the brake caliper 4.

d) The driver 20 compensates an axial offset and angle errors. Owing to position tolerances, there is an axial offset and an angle offset between the sensor axis 14d of the gearing input 14c and the driver axis 5'a of the threaded spindle 6'. Said axial offset can be compensated by way of the design of the driver 20.

Figure 9:
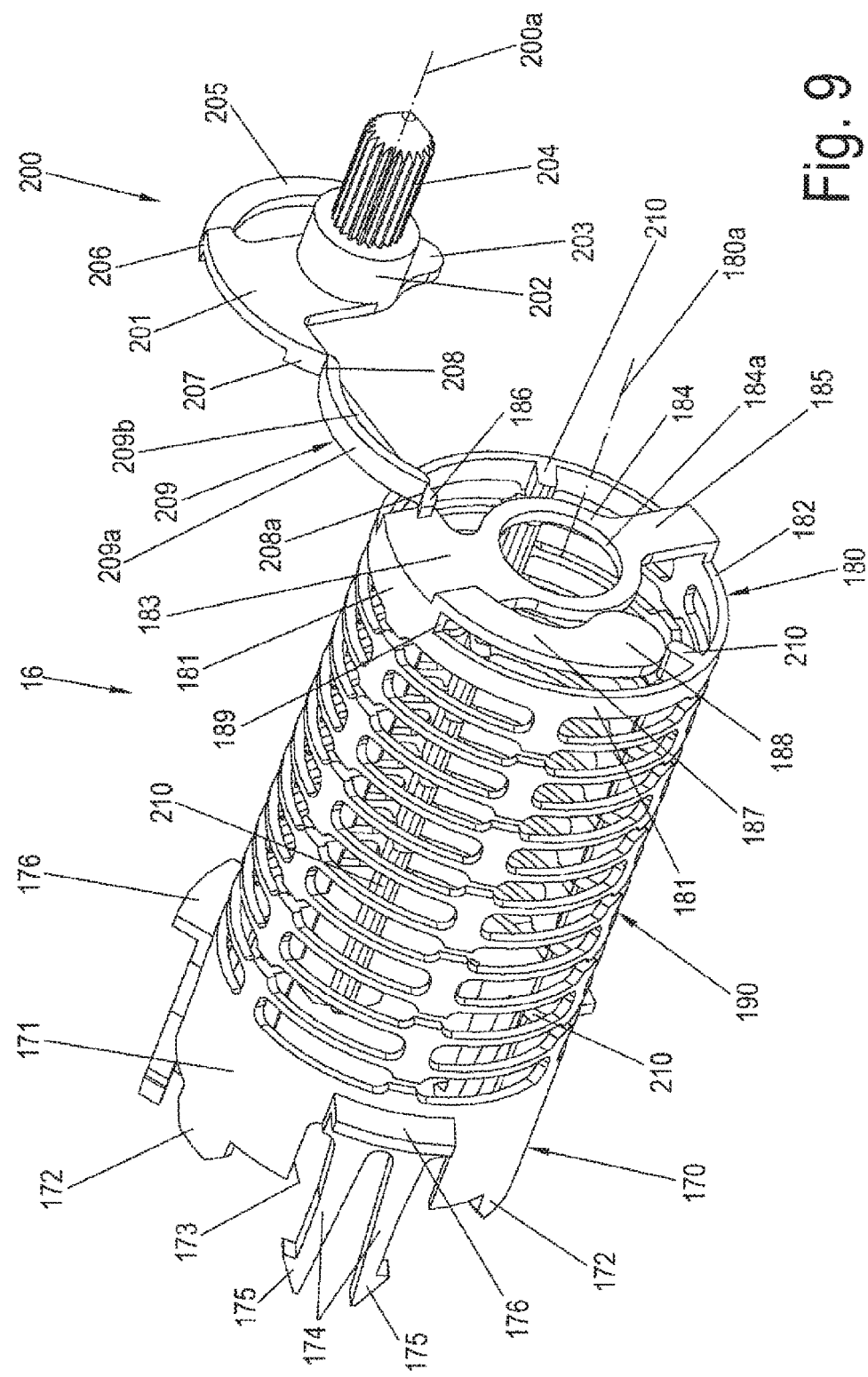
FIGS. 9-9c show perspective views of a variant of the transmission unit.
Figure 9B:
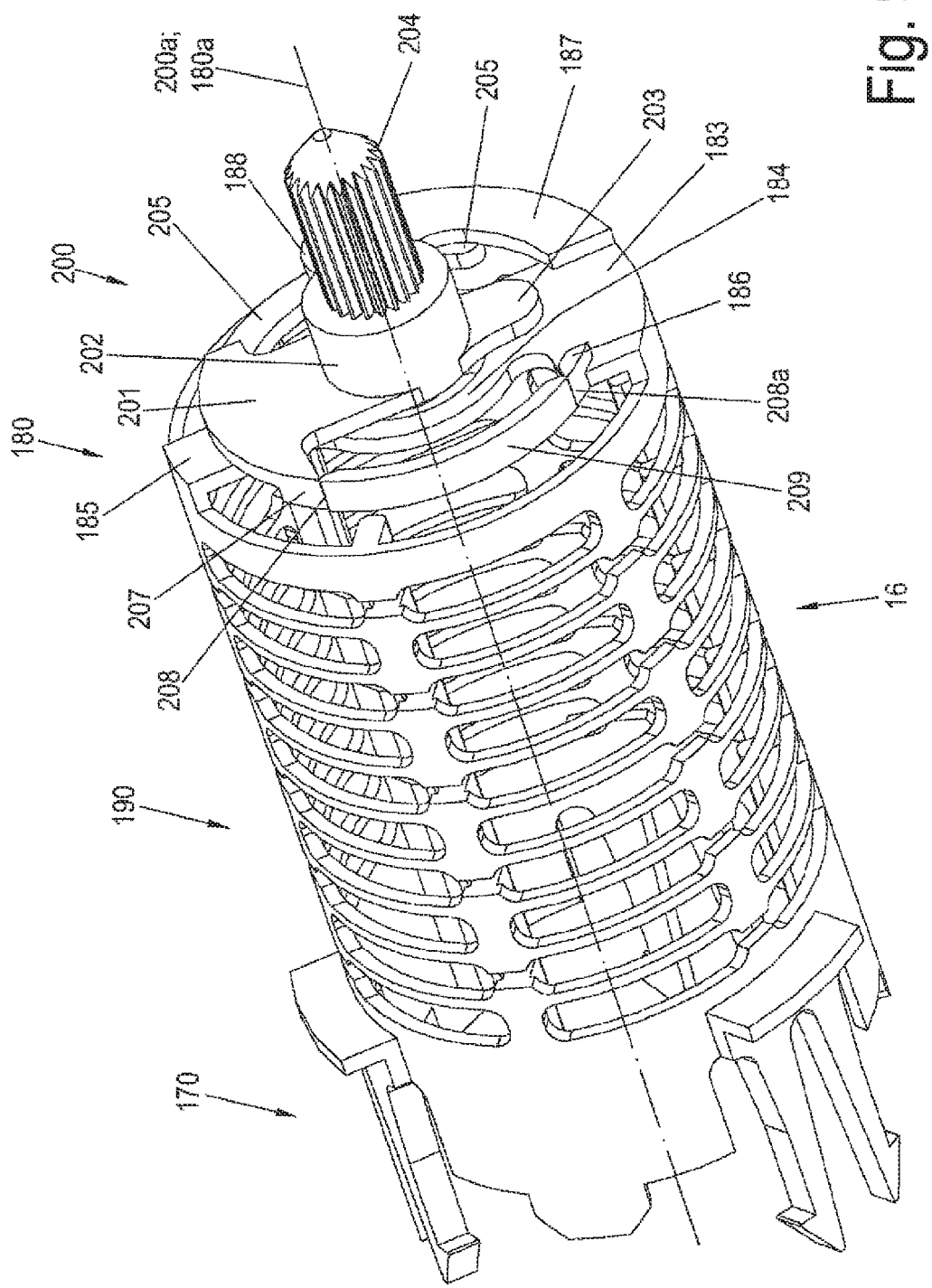
FIGS. 9d-e show cross-sectional views of a spring element of the variant as per FIGS. 9-9c.
Figure 9D:
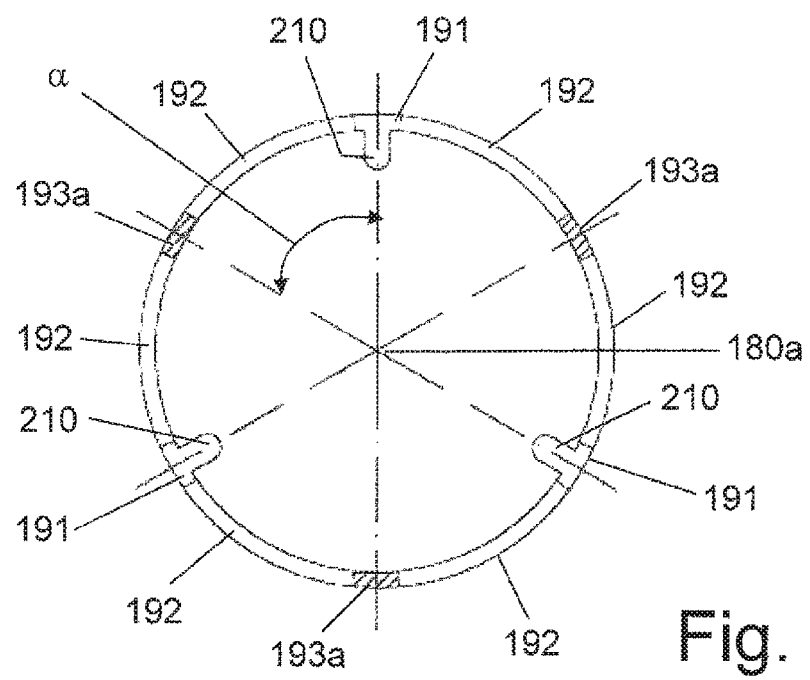
Figure 9E:
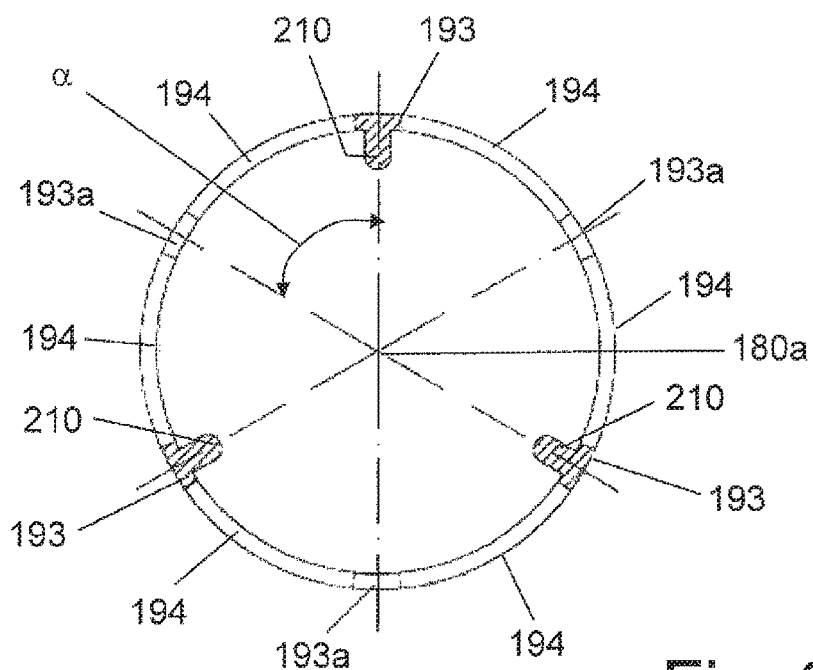

FIGS. 9-9c show perspective views of a variant of the transmission unit 16. FIGS. 9 and 9a show the transmission unit in a non-assembled position from different viewing angles, whereas FIGS. 9b and 9c show the transmission unit 16 in an assembled position, also from different viewing angles. FIGS. 9d and 9e show partially sectional views of a spring element 190 of the variant as per FIGS. 9-9c.

The transmission unit 16 of said variant comprises a drive-input sleeve 170, a drive-output sleeve 180, a spring element 190 and a driver 200.

Said variant of the transmission unit 16 differs from the transmission unit 16 as per FIGS. 3-8 firstly in that the drive-input sleeve 170, the drive-output sleeve 180, the spring element 190 and the driver 200 are formed in one piece. Here, the driver 200 is captively attached to the drive-output sleeve 180 as an installation part. FIGS. 9-9a show said still-unassembled position. The drive-input sleeve 170, the spring element 190 and the drive-output sleeve 180 have, in this case, a common central axis 180a.

Secondly, the designs of the functional parts 170, 180, 190, 200 differ. The drive sleeve 170 has a circular hollow cylindrical body 171, on the pad-side end section of which there are in this case formed three projections 172 which are distributed uniformly over the circumference and which extend in an axial direction toward the pad side. Here, the projections 172 are rectangular, wherein the free corners thereof are each equipped with a bevel. The projections 172 serve for the rotationally conjoint connection of the drive sleeve 170 and thus of the transmission unit 16 to the synchronizing wheel 12'a when the transmission unit 16 has been pushed fully over the threaded spindle 6'. It is self-evidently also possible for depressions of a similar or identical shape to be provided instead of the projections 172. For this purpose, the synchronizing wheel 12'a has corresponding slots or projections, which are not shown here but which are easily conceivable.

Furthermore, the drive-input sleeve 170 has, between in each case two projections 172, a recess 173 in which there is arranged in each case one detent device by way of which the transmission device 16 can be axially locked to the synchronizing wheel 12'a. Said detent devices have in each case two holding arms 174 with in each case one lug 175. Here, in each case two holding arms 174 which are arranged adjacent to and spaced apart from one another on the circumference in the respective recess 173 extend axially toward the pad side beyond the pad-side end section of the drive-input sleeve 170. The lugs 175 on the free ends of the holding arms 74 are arranged in mirror-symmetrical fashion, wherein said lugs form detent hooks, the detent edges of which point in each case toward a projection 172.

For interaction with the lugs 175 and the detent edges thereof, the synchronizing wheel 12'a has corresponding receptacles, which are not shown but which are easily conceivable.

The holding arms 174, at their end attached to the end section of the drive-input sleeve 170 above the recesses 173, are connected to one another, are arranged on the outer wall of the body 171 of the drive-input sleeve 170, and end in each case together in a collar section 176. The collar sections 176 extend on the circumference of the body 171, approximately over the circumference of the respective associated recess 173, and protrude radially from the outer wall of the body 171 of the drive-input sleeve 170, wherein the collar sections 176 form flange sections similar to the flanges 17d (FIG. 6) of the drive-input sleeve 17.

The collar sections 176 of the holding arms 174 in the regions between the projections 172 serve as a support surface for an installation sleeve (not shown) for the transmission of an axial installation force in order that the holding arms 174 can be pressed by way of their lugs 175 (which may also be referred to as being hook-shaped) into the associated counterpart. The regions with the projections 172 are in this case equipped in each case with a web 210, which is attached to the associated inner walls of the body 171 of the drive-input sleeve 170 (see also FIGS. 9a and 9c). The webs 210 run in an axial direction through the drive-input sleeve 170 and through the spring element 190 into the drive-output sleeve 180. Here, the webs 210 are, in the region of the spring element 190, divided axially into individual sections; this will be discussed in more detail below and can be seen most clearly in FIG. 9c. The function of the webs 210 consists in serving as axial guide webs, which engage with axial grooves of the associated threaded spindle 6'.

The application-side end of the drive-input sleeve 170 is connected to the spring element 190.

The spring element 190 comprises spring arm holders 191, spring arms 192, 194 and spring arm connectors 193, 193a. An imaginary envelope of the spring element 190 is a circular hollow cylinder with the central axis 180a, wherein the spring arms 192, 194 each form rings which, in this case, are arranged one behind the other in an axial direction, in each case at uniform intervals to one another. Here, the rings have a circular shape. A circular ring of said type is composed in this case of six spring arms 192, 194. The spring arm connectors 193, 193a connect the spring arms 192, 194 of a respective circular ring and of a circular ring axially adjacent thereto to one another in alternating fashion in a particular way which will be described in more detail below, wherein the spacing of the circular rings is thus defined. The spring element 190 has, in this case, eleven circular rings. Each spring arm 192, 194 is in the form of a circular ring section.

FIG. 9d shows, in a partial view, a first circular ring in a plan view (in a viewing direction toward the face side of the drive-input sleeve 170) in a cross-sectional view of the spring element 190 as per FIG. 9 transversely with respect to the central axis 180a. Said first circular ring serves for the connection of the spring element 190 to the drive-input sleeve 170 by way of in this case three spring arm holders 191 which are distributed over the circumference of the drive-input sleeve 170. Each spring arm holder 191 is attached to the application-side end of the drive-input sleeve 170 to be situated opposite a projection 172, and projects parallel to the central axis 180a to a certain extent. On the inner side of each spring arm holder 191, there is integrally formed in each case one web 210 as an elongation of the inner wall of the body 171.

The first circular ring for the connection of the spring element 190 to the drive-input sleeve 170 is constructed as follows. Beginning at the spring arm holder 191 shown at the top in FIG. 9d (at 12 o'clock), and running counter-clockwise, a spring arm 192 is attached by way of one end to the free end of the spring arm holder 191. The other end of the spring arm 192 is connected by way of a spring arm connector 193 to a further spring arm 192, the other end of which is in turn fastened to a further spring arm holder 191 (at 8 o'clock). An angle α between a spring arm holder 191 and a spring arm connector 193 is in this case 60°, wherein, in each case, an angle between two spring arm holders 191 or between two spring arm connectors 192 is 2α=120°.

In the same way, said spring arm holder 191 (at 8 o'clock) is connected to the next spring arm holder 191 (at 4 o'clock) by way of two spring arms 192 which are connected to a spring arm connector 193. Said next spring arm holder 191 (at 4 o'clock) is likewise connected to the spring arm holder 191 (at 12 o'clock) by way of two spring arms 192 which are connected to a spring arm connector 193.

Here, the spring arm holders 193*a* do not have webs 210, and extend parallel to the central axis 180*a* in a longitudinal direction as far as the next circular ring, with which they form an axial connection.

The next circular ring is illustrated in FIG. 9*e*. Said circular ring is in this case also composed of six spring arms 194. Proceeding from the spring arm connector 193*a* (at 10 o'clock), which projects from the first circular ring (FIG. 9*d*) axially into said circular ring plane of FIG. 9*e*, a spring arm 194 is attached by way of one end in a clockwise direction. The other end of said spring arm 194 is connected to a spring arm connector 193 (at 8 o'clock), which spring arm connector is stiffened on its inner side by way of a web 210 and forms an axial connection to the next circular ring, which lies above the plane of the drawing of FIG. 9*e*. Said web 210 is not connected to the web 210 of the first circular ring but is separate therefrom, but runs in the same direction. The spring arm connector 193 (at 8 o'clock) with web 210 is connected to a spring arm 194, which is attached to a spring arm connector 193*a* (at 6 o'clock) which produces an axial connection to the first circular ring and a tangential connection to a further spring arm 194. The further spring arm 194 is attached to the next spring arm connector 193 (at 4 o'clock), which is an axial connection to the next circular ring and a tangential connection to the next spring arm 194. In the same way, the further spring arm connectors 193*a* form an axial connection to the first circular ring, and the further spring arm connectors 193 form an axial connection to the next circular ring and tangential connections to the further spring arms, as can be clearly seen from FIG. 9*e*.

In this way, the spring element 190 is constructed with circular rings which, in an axial direction of the central axis 180*a*, are arranged parallel to one another transversely with respect to said central axis. The final circular ring forms a connection of the spring element 190 to the drive-output sleeve 180 and, like the first circular ring, is formed with spring arms 192 which are connected alternately by way of spring arm holders 191 to a body 181 of the drive-output sleeve 180 and by way of spring arm connectors 193*a* to the penultimate circular ring of the spring element 190 (see FIG. 9*d*).

The spring arms 192, 194, owing to their tangential arrangement and their axial connections of the circular rings that they form, make it possible for a rotation of the drive-input sleeve 170 about the central axis 180*a* to be transmitted with little play and in rigid fashion to the drive-output sleeve 180. Furthermore, the spring arms 192, 194 can deflect in an axial direction. Thus, an axial stroke of the components to be connected is possible, and an axial preload between the components to be connected is ensured. In other directions, the spring arms 192, 194 can likewise deflect, and thus simultaneously permit an axial offset and/or incorrect angular positioning of the components to be connected.

The body 181 of the drive-output sleeve 180 is in this case of circular cylindrical form and, at its pad-side face side, has the spring arm connectors 191 which are equipped on their inner sides with webs 210, wherein the webs 210 also extend further on the inner wall of the body 181 of the drive-output sleeve 180, parallel to the central axis 180*a*. A face side 182 of the body 181 is partially covered by a plate-like face surface section 183 which, in the center, transitions diagonally into a ring-shaped face surface section 184 with an opening 184*a* and then runs, by way of a further, relatively narrow face surface section 195, to the opposite edge of the face side 182, to which said face surface section 185 is connected by way of an axially running section.

On one side of the plate-like face surface section 183 there is integrally formed a bearing projection 186 which projects axially toward the application side, to which bearing projection the driver 200, as discussed further below, is attached. To the opposite side of the plate-like face surface section 183 there is attached a top section 187 with a free end section 188 of circular form. The top section 187 extends around the circumference of the body 181 over a certain angle segment, wherein a slot 189 is defined between the underside of the rim of the top section 187 and the face side 182 of the body 181. Said slot 189 is formed by virtue of the fact that the plane of the top section 187 with the end section 188 is integrally formed so as to be offset, by way of a shoulder, axially toward the application side with respect to the plane of the plate-like face surface section 183. The slot 189 receives an arm 205 of the driver 200 in the assembled state and fixes said arm axially. The circular end section 188 serves for the stiffening of the top section 187 and for enhancing the receiving function of the slot 189.

The driver 200 is formed with a body 201 with a tongue 203, which body is formed similarly to the plate-like face surface section 183 of the drive-output sleeve 180 and, at its outer edge, has a radius. In the center, the body 201 has an axially projecting dome 202, which has an output section 204 with a profiling that has already been described further above. The output section 204 and the dome 202 have a central axis 200*a*.

On that side of the plate-like body 201 which, in the non-assembled state as per FIGS. 9 and 9*a*, points toward the drive-output sleeve 180, there is integrally formed a bearing projection 207 (similar to the bearing projection 186) which projects toward the pad side and to which a connecting section 209 is pivotably attached by way of one end via a bearing 208. The other end of the connecting section 209 is likewise pivotably articulatedly connected, by way of a bearing 208*a*, to the bearing projection 186 of the drive-output sleeve 180. The pivot axes of the bearings 208, 208*a* run parallel to the central axis 180*a*. The connecting section 209 has a wall 209*a* which is in the shape of a segment of a circular cylinder and which is attached perpendicularly to a plate section 209*b*. The bearings 208, 208*a* may for example be film hinges.

The arm 205 is attached by way of a shoulder-like connection 206 to that side of the plate-like body 201 of the driver 200 which is situated opposite the bearing projection 207, in such a way that the arm 205 is offset axially toward the pad side relative to the plate-like body 201. The arm 205 is of arcuate form.

The dome 202, which is hollow from the underside (see FIG. 9*a*), is equipped with a tubular dome section 202*a* which projects toward the pad side and which projects axially from the underside of the plate-like body 201. The dome section 202*a* is arranged coaxially with respect to the dome 202 with the central axis 200*a* and so as to be spaced apart from the inner wall of the dome 202.

In the assembled state of the transmission unit 16 (FIGS. 9*b*-9*c*), the driver 20 has been pivoted about the two bearings 208, 208*a* onto the drive-output sleeve 180, wherein the central axis 200*a* of said driver and the central axis 180*a* of the transmission unit 16 are in alignment. Here, the underside of the plate-like body 201 of the driver 200 lies on sections of the top side of the face surface sections 184, 185 of the drive-output sleeve 180. Furthermore, the underside of the tongue 203 lies on the face surface section 183 of the drive-output sleeve 180.

In the assembled state of the transmission unit 16, the dome section 202*a* is situated within the circular opening 184a of the drive-output sleeve 180, as can be clearly seen in FIG. 9c. The arcuate arm 205 of the driver 200 has been inserted into, and received in, the slot 189 between the face side 182 and the underside of the top section 187, including the circular end section 188, of the drive-output sleeve 180. The arcuate rim of the plate-like body 201 of the driver 200 transitions into the arcuate wall 209a of the connecting section 209, and thus realizes a transmission of torque between drive-output sleeve 180 and driver 200.

By way of this arrangement, an axial offset between the central axes 200a and 180a can be compensated.

In this variant, the transmission unit 16 may for example be a unipartite plastics injection-molded part. Embodiments composed of an elastomer, metal or combinations of these may self-evidently also be possible, wherein, for example, use may also be made of insert parts.

It is contemplated for the functionality of a facility for compensating an axial offset, such as is provided by the driver 20, to also be integrated in the drive-output sleeve 18 of the transmission unit 16 and/or in the sensor gearing 14b of the sensor device 14.

The spring element 19 may also be integrated into the drive-output sleeve 18 and/or into the drive-input sleeve 17.

It is also contemplated for a cross section of the transmission unit 16, of the sleeves 170, 180 and of the spring element 190 to be not circular but, for example, oval or polygonal.

List of reference designations
1 Disc brake
2 Brake disc
2a Brake disc axis
3 Brake pad
3a Brake pad carrier
4 Brake caliper
5, 5' Spindle unit
5a Readjuster axis
5'a Driver axis
6, 6' Threaded spindle
6a, 6'a Thrust piece
7 Bridge
7a Restoring spring
8 Brake rotary lever
8a Lever arm
8b Lever pivot axis
9 Wear-compensating readjustment apparatus
10 Readjustment device
11 Driver device
12 Synchronizing unit
12a, 12'a Synchronizing wheel
12b Synchronizing device
13 Readjuster drive
13a Actuator
13b Readjuster drive element
14 Sensor device
14a Sensor housing
14b Sensor gearing
14c Gearing input
14d Sensor axis
14e Encoder
15 Sensor drive
16 Transmission unit
17 Drive-input sleeve
17a Body
17b External profile
17c Drive-input profile
17d Flange
17e Drive-input section
17f Face side
17g Face section
17h Shoulder
17i Slot
17j Holding section
18 Drive-output sleeve
18a Body
18b Internal profile
18c Rim
18d Base
18e Opening profile
19 Spring element
20 Driver
20a Body
20b Input section
20c Output section
21 Internal profile
21a Bevel
112 Synchronizing wheel body
112a Toothing
112b Transmission section
112c Internal groove
117, 118 Central axis
170 Drive-input sleeve
171 Body
172 Projection
173 Recess
174 Holding arm
175 Lug
176 Collar section
180 Drive-output sleeve
180a Central axis
181 Body
182 Face side
183, 184, 185 Face surface section
184a Opening
186 Bearing projection
187 Top section
188 End section
189 Slot
190 Spring element
191 Spring arm holder
192 Spring arm
193, 193a Spring arm connector
194 Spring arm
200 Driver
200a Central axis
201 Body
202 Dome
202a Dome section
203 Tongue
204 Output section
205 Arm
206 Connection
207 Bearing projection
208, 208a Bearing
209 Connecting section
209a Wall
209b Plate section
210 Web
α Angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor apparatus for detecting wear of brake pads and a brake disc of a disc brake, comprising:
    a sensor device having at least one encoder and a sensor gearing which is coupled to the at least one encoder and has at least one gearing input;
    a transmission unit coupled to the at least one gearing input, the transmission unit being configured to couple the at least one gearing input to a threaded spindle of the disc brake for transmission of a rotational movement associated with the wear to be detected, wherein
    the transmission unit comprises a drive-input sleeve for rotationally conjoint coupling to the threaded spindle, a drive-output sleeve which is coupled to the drive-input sleeve, at least one spring element, and a driver which is coupled rotationally conjointly to the drive-output sleeve for rotationally conjoint coupling to the at least one gearing input, and
    the drive-output sleeve is coupled rotationally rigidly to the drive-input sleeve by way of the at least one spring element, and is arranged so as to be axially movable relative to the drive-input sleeve by way of the at least one spring element.

2. The sensor apparatus as claimed in claim 1, wherein the rotationally conjoint coupling of the drive-input sleeve to the threaded spindle is formed directly or is formed indirectly via one or more intermediate components.

3. The sensor apparatus as claimed in claim 1, wherein an end of the drive-output sleeve away from the drive-input sleeve is closed off by way of a base which has an opening with an opening profile.

4. The sensor apparatus as claimed in claim 3, wherein:
    the driver has a body which is connected to an input section and to an output section,
    the input section has, for coupling to the opening profile of the drive-output sleeve, an external profile which corresponds to the opening profile, and
    the output section has, for coupling to the at least one gearing input of the sensor device, an external profile which corresponds to an internal profile of the at least one gearing input.

5. The sensor apparatus as claimed in claim 1, wherein the drive-input sleeve and the drive-output sleeve are produced from an elastic and ductile material.

6. The sensor apparatus as claimed in claim 1, wherein the drive-output sleeve and the drive-input sleeve can be installed with an axial preload relative to one another by way of the at least one spring element.

7. The sensor apparatus as claimed in claim 6, wherein the at least one spring element comprises spring arms and spring arm connectors and is connected, by way of spring arm holders at each end of the at least one spring element, respectively to the drive-input sleeve and to the drive-output sleeve.

8. The sensor apparatus as claimed in claim 7, wherein:
    the spring arms, spring arm connectors and spring arm holders of the at least one spring element form rings around a central axis of the at least one spring element,
    the rings are arranged so as to be spaced apart from one another in a longitudinal direction of the at least one spring element.

9. The sensor apparatus as claimed in claim 8, wherein the spring arm connectors and spring arm holders connect axially adjacent spring arms of the rings to one another.

10. The sensor apparatus as claimed in claim 9, wherein the driver is coupled to the drive-output sleeve by way of a connecting section so as to be pivotable from a non-assembled state into an assembled state.

11. The sensor apparatus as claimed in claim 1, wherein the drive-input sleeve, the drive-output sleeve, the at least one spring element and the driver are produced in one piece.

12. A disc brake for a motor vehicle, comprising:
    at least two spindle units with, in each case, one threaded spindle;
    a bridge into which the threaded spindles are screwed;
    a brake application apparatus having a spreading mechanism that interacts with the bridge;
    a wear-compensating readjustment apparatus having at least one mechanical readjustment device arranged around and coupled to at least one of the threaded spindles and coupled to the spreading mechanism;
    a synchronizing unit having synchronizing wheels and a synchronizing device that couples the synchronizing wheels, wherein each threaded spindle is rotationally conjointly coupled to, in each case, one of the synchronizing wheels;
    a sensor apparatus that detects wear of brake pads and a brake disc of the disc brake, the sensor apparatus comprising:
        a sensor device having at least one encoder and a sensor gearing which is coupled to the at least one encoder and has at least one gearing input;
        a transmission unit coupled to the at least one gearing input, the transmission unit being configured to couple the at least one gearing input to one of the at least two threaded spindles for transmission of a rotational movement associated with the wear to be detected, wherein
    the transmission unit comprises a drive-input sleeve for rotationally conjoint coupled to the threaded spindle, a drive-output sleeve which is coupled to the drive-input sleeve, at least one spring element, and a driver which is coupled rotationally conjointly to the drive-output sleeve for rotationally conjoint coupling to the at least one gearing input,
    an end of the drive-input sleeve of the transmission unit is connected rotationally conjointly to the threaded spindle, directly or indirectly via one or more intermediate components, by way of the synchronizing wheels which is coupled rotationally conjointly to the threaded spindle, and
    the drive-output sleeve is coupled rotationally rigidly to the drive-input sleeve by way of the at least one spring element, and is arranged so as to be axially movable relative to the drive-input sleeve by way of the at least one spring element.

13. The disc brake as claimed in claim 12, wherein at least one of the synchronizing wheels has a ring-shaped transmission section with, arranged on an inner wall thereof, a drive-output profile which corresponds to, and engages with, a drive-input profile of the end of the drive-input sleeve of the transmission unit.

14. The disc brake as claimed in claim 12, wherein the disc brake is actuated using compressed air.

* * * * *